United States Patent
Ogata et al.

(10) Patent No.: US 8,956,133 B2
(45) Date of Patent: Feb. 17, 2015

(54) VEHICULAR INTERNAL GEAR TYPE OIL PUMP

(75) Inventors: Yusuke Ogata, Toyota (JP); Yoshihiro Mizuno, Toyota (JP); Masashi Hattori, Anjo (JP); Masahiro Ito, Okazaki (JP); Naoki Okoshi, Anjo (JP); Kenichi Mori, Anjo (JP); Masahiko Suzuki, Anjo (JP); Fumitake Suzuki, Nishio (JP); Hidenobu Yamaguchi, Handa (JP); Haruhiko Shibata, Okazaki (JP)

(73) Assignees: Toyota Jidosha Kabushiki Kaisha, Aichi-ken (JP); Aisin AW Co., Ltd., Aichi-ken (JP); JTEKT Corporation, Osaka (JP); Toyooki Kogyo Co., Ltd., Aichi (JP)

( * ) Notice: Subject to any disclaimer, the term of this patent is extended or adjusted under 35 U.S.C. 154(b) by 120 days.

(21) Appl. No.: 13/704,094
(22) PCT Filed: Jun. 17, 2011
(86) PCT No.: PCT/IB2011/001367
§ 371 (c)(1),
(2), (4) Date: Dec. 13, 2012
(87) PCT Pub. No.: WO2011/158104
PCT Pub. Date: Dec. 22, 2011

(65) Prior Publication Data
US 2013/0089453 A1  Apr. 11, 2013

(30) Foreign Application Priority Data
Jun. 18, 2010 (JP) ................... 2010-140016

(51) Int. Cl.
*F04C 2/00* (2006.01)
*F01C 1/02* (2006.01)
(Continued)

(52) U.S. Cl.
CPC ................. *F04C 2/082* (2013.01); *F04C 2/102* (2013.01); *F04C 15/0049* (2013.01); *F04C 15/062* (2013.01); *F04C 2210/14* (2013.01); *F16H 61/0025* (2013.01)
USPC ......................................... 418/171; 418/61.3

(58) Field of Classification Search
CPC .... F04C 15/0049; F04C 15/062; F04C 2/082; F04C 2/102; F04C 2210/14; F16H 61/0025
USPC ................................ 418/61.1–61.3, 166, 171
See application file for complete search history.

(56) References Cited

U.S. PATENT DOCUMENTS
4,213,744 A * 7/1980 Davis et al. ................... 417/310
5,263,818 A * 11/1993 Ito et al. ......................... 418/15
(Continued)

FOREIGN PATENT DOCUMENTS
EP  0 660 000 A1  6/1995
JP  46-014946 B  4/1970
(Continued)

OTHER PUBLICATIONS
International Search Report for corresponding International Patent Application No. PCT/IB2011/001367 mailed Oct. 27, 2011, In English.
(Continued)

Primary Examiner — Hoang Nguyen
(74) Attorney, Agent, or Firm — Sughrue Mion, PLLC

(57) ABSTRACT

An oil pump includes a first spill passage formed on a side surface (60) of a pump chamber (58) to communicate a hydraulic pressure chamber (54) with a first high pressure discharge passage (68) when the entire hydraulic pressure chamber (54) is positioned between the first high pressure discharge passage (68) and a first low pressure discharge passage (70). Therefore, when the hydraulic pressure chamber (54) passes between the first high pressure discharge passage (68) and the first low pressure discharge passage (70), the hydraulic pressure inside the predetermined hydraulic pressure chamber (54) escapes to the first high pressure discharge passage (68) through a first spill passage (76), so a hydraulic pressure value inside the hydraulic pressure chamber (54) is maintained at the pressure value inside the first high pressure discharge passage (68). As a result, fluid is inhibited from flowing into the hydraulic pressure chamber (54) from the first high pressure discharge passage (68) through a space between inner peripheral teeth (48) and outer peripheral teeth (42).

4 Claims, 10 Drawing Sheets

(51) Int. Cl.
*F04C 2/08* (2006.01)
*F04C 2/10* (2006.01)
*F04C 15/00* (2006.01)
*F04C 15/06* (2006.01)
*F16H 61/00* (2006.01)

(56) References Cited

U.S. PATENT DOCUMENTS

| | | | |
|---|---|---|---|
| 5,380,169 A | 1/1995 | Eisenmann | |
| 6,648,611 B2 * | 11/2003 | Morse et al. | 417/310 |
| 6,739,850 B2 * | 5/2004 | Kawasaki et al. | 418/171 |
| 2006/0216187 A1 | 9/2006 | Enzaka et al. | |
| 2009/0293834 A1 * | 12/2009 | Ono et al. | 123/196 R |
| 2010/0008797 A1 * | 1/2010 | Yukitake | 417/310 |

FOREIGN PATENT DOCUMENTS

| | | |
|---|---|---|
| JP | 2002-202018 A | 7/2002 |
| JP | 2009-127569 A | 6/2009 |

OTHER PUBLICATIONS

Partial Translation of Japanese Office Action for corresponding JP Patent Application No. 2010-140016 issued on Oct. 22, 2013.

* cited by examiner

VEHICULAR INTERNAL GEAR TYPE OIL PUMP

BACKGROUND OF THE INVENTION

1. Field of the Invention

The invention relates to a vehicular internal gear type oil pump that has a high pressure discharge passage and a low pressure discharge passage. More particularly, the invention relates to technology for reducing the volumetric efficiency on the high pressure discharge side.

2. Description of Related Art

Japanese Patent Application Publication No. 2009-127569 (JP-A-2009-127569) describes a vehicular internal gear type oil pump that has a drive gear that has outer peripheral teeth and is provided rotatable about an axis; an annular driven gear that is provided rotatable about an offset axial center that is offset from the axis, and that is rotatably driven by the driven gear; a pump chamber that houses the driven gear and the drive gear; and a housing that has a high pressure discharge passage and a low pressure discharge passage that are open, a predetermined distance apart from each other in the circumferential direction, to a side surface of the pump chamber in order to discharge fluid (i.e., oil) from within the pump chamber. In this vehicular internal gear type oil pump, a plurality of hydraulic pressure chambers formed in the circumferential direction by mesh gaps between the inner peripheral teeth and the outer peripheral teeth move in a predetermined rotational direction with the rotation of the drive gear and the driven gear, such that the hydraulic pressure chambers become communicated with the high pressure discharge passage and the low pressure discharge passage, in order, in a process in which the volume of the hydraulic pressure chambers is reduced.

The hydraulic fluid in the low pressure discharge passage is switched between being merged with the hydraulic fluid in the high pressure discharge passage and being maintained at a low hydraulic pressure that is comparatively lower than the hydraulic pressure in the high pressure discharge passage, by a hydraulic pressure regulating device such as a regulator, for example, that is provided on the downstream side of the low pressure discharge passage. Also, if the amount of relatively high pressure hydraulic fluid that is consumed is satisfied by (i.e., does not exceed) the amount discharged from the high pressure discharge passage alone, the hydraulic fluid in the low pressure discharge passage is maintained at the low hydraulic pressure and used for lubricating or cooling, for example. Also, if the amount of relatively high pressure hydraulic fluid that is consumed is not satisfied by (i.e., exceeds) the amount discharged from the high pressure discharge passage alone, the hydraulic fluid in the low pressure discharge passage is merged with the hydraulic fluid in the high pressure discharge passage and supplied to the hydraulic pressure circuit.

Also, the vehicular internal gear type oil pump described in JP-A-2009-127569 includes a spill groove formed in a side surface of the pump chamber, so that when an entire predetermined hydraulic pressure chamber, from among the plurality of hydraulic pressure chambers, is positioned between the high pressure discharge passage and the low pressure discharge passage, the predetermined hydraulic pressure chamber is communicated with the low pressure discharge passage. Accordingly, the hydraulic fluid in the predetermined hydraulic pressure chamber, in which the pressure starts to rise when the predetermined hydraulic pressure chamber passes between the high pressure discharge passage and the low pressure discharge passage, escapes into the low pressure discharge passage through the spill groove. Therefore, it is possible to prevent the hydraulic pressure in this hydraulic pressure chamber that is closed off from suddenly rising due to the volume of this hydraulic pressure chamber being reduced, and thus it is possible to prevent the driving torque of the oil pump from increasing due to an increase in the hydraulic pressure in this hydraulic pressure chamber.

Incidentally, with the vehicular internal gear type oil pump described above, when the hydraulic pressure in the low pressure discharge passage is maintained at the low hydraulic pressure, and a predetermined hydraulic pressure chamber passes between the high pressure discharge passage and the low pressure discharge passage, the hydraulic fluid in this predetermined hydraulic pressure chamber escapes into the low pressure discharge passage through the spill groove, so the hydraulic pressure value in the predetermined hydraulic pressure chamber is reduced to the low hydraulic pressure or a pressure near there. As a result, fluid flows between the inner peripheral teeth and the outer peripheral teeth (i.e., the tip clearance) and into the predetermined hydraulic pressure chamber from the high pressure discharge passage, i.e., an oil leak occurs, due to a difference between the hydraulic pressure value in the predetermined hydraulic pressure chamber and the hydraulic pressure value in a hydraulic pressure chamber that is adjacent to this predetermined hydraulic pressure chamber and that is communicated with the high pressure discharge passage. As a result, the volumetric efficiency of the high pressure discharge side may decrease.

SUMMARY OF THE INVENTION

The invention thus provides a vehicular internal gear type oil pump capable of suppressing a decrease in volumetric efficiency on a high pressure discharge side, while preventing a sudden rise in hydraulic pressure in a hydraulic pressure chamber.

One aspect of the invention relates to a vehicular internal gear type oil pump that includes a drive gear that has outer peripheral teeth and that is provided rotatable about an axis; an annular driven gear that has inner peripheral teeth that mesh with the outer peripheral teeth of the drive gear and that is provided rotatable about an offset axis that is offset from the axis, and that is rotatably driven by the drive gear; a pump chamber inside of which the driven gear and the drive gear are housed; and a housing that has a high pressure discharge passage and a low pressure discharge passage that are open, a predetermined distance apart from each other in a circumferential direction, to a side surface of the pump chamber, in order to discharge fluid from within the pump chamber, wherein a plurality of hydraulic pressure chambers, that are formed in the circumferential direction by a mesh gap between the inner peripheral teeth and the outer peripheral teeth, move in a predetermined rotational direction as the drive gear and the driven gear rotate, and the hydraulic pressure chambers are communicated with the high pressure discharge passage and the low pressure discharge passage in a process in which the volume of the hydraulic pressure chambers is reduced. This vehicular internal gear type oil pump also includes a spill passage formed in a side surface of the pump chamber to communicate a predetermined hydraulic pressure chamber, from among the plurality of hydraulic pressure chambers, with the high pressure discharge passage when the entire predetermined hydraulic pressure chamber is positioned between the high pressure discharge passage and the low pressure discharge passage.

According to the oil pump of this aspect, the spill passage is provided formed on the side surface of the pump chamber to communicate the predetermined hydraulic pressure chamber, from among the plurality of hydraulic pressure chambers, with the high pressure discharge passage when the entire predetermined hydraulic pressure chamber is positioned between the high pressure discharge passage and the low pressure discharge passage. Therefore, when the hydraulic pressure inside the low pressure discharge passage is reduced to a predetermined low hydraulic pressure, and the predetermined hydraulic pressure chamber passes between the high pressure discharge passage and the low pressure discharge passage, the hydraulic pressure inside the predetermined hydraulic pressure chamber escapes to the high pressure discharge passage through the spill passage, so the hydraulic pressure value inside the predetermined hydraulic pressure chamber is maintained at the same predetermined high hydraulic pressure as the high pressure discharge passage. Therefore, the difference between the hydraulic pressure value inside the predetermined hydraulic pressure chamber and the hydraulic pressure value inside a hydraulic pressure chamber that is adjacent to the predetermined hydraulic pressure chamber and that is communicated with the high pressure discharge passage will not increase, so fluid is inhibited from flowing into the predetermined hydraulic pressure chamber from the high pressure discharge passage through the space (i.e., the tip clearance) between the inner peripheral teeth and the outer peripheral teeth. As a result, the volumetric efficiency on the high pressure discharge side can be inhibited from decreasing, while the hydraulic pressure inside the hydraulic pressure chamber is prevented from suddenly increasing.

Also, in the vehicular internal gear type oil pump described above, the high pressure discharge passage may be provided behind, in the rotational direction, the low pressure discharge passage, and the spill passage may include at least one of an outer circumferential groove or an inner circumferential groove, in which, when the entire predetermined hydraulic pressure chamber is positioned between the high pressure discharge passage and the low pressure discharge passage, the outer circumferential groove extends in the circumferential direction forward in the rotational direction from a radially outer side of a mesh position of the inner peripheral teeth and the outer peripheral teeth of a front end surface in the rotational direction of the high pressure discharge passage, and a tip end portion of the outer circumferential groove is communicated with the predetermined hydraulic pressure chamber, and the inner circumferential groove extends in the circumferential direction forward in the rotational direction from a radially inner side of the mesh position of the inner peripheral teeth and the outer peripheral teeth of the front end surface in the rotational direction of the high pressure discharge passage, and a tip end portion of the inner circumferential groove is communicated with the predetermined hydraulic pressure chamber.

According to this structure, the high pressure discharge passage is provided behind the low pressure discharge passage in the rotational direction. Also, the spill passage is formed by at least one of the outer circumferential groove or the inner circumferential groove, in which, when the entire predetermined hydraulic pressure chamber, from among the plurality of hydraulic pressure chambers, is positioned between the high pressure discharge passage and the low pressure discharge passage, the outer circumferential groove extends in the circumferential direction forward in the rotational direction from a radially outer side of a mesh position of the inner peripheral teeth and the outer peripheral teeth of a front end surface in the rotational direction of the high pressure discharge passage, and a tip end portion of the outer circumferential groove is communicated with the predetermined hydraulic pressure chamber, and the inner circumferential groove extends in the circumferential direction forward in the rotational direction from a radially inner side of the mesh position of the inner peripheral teeth and the outer peripheral teeth of the front end surface in the rotational direction of the high pressure discharge passage, and a tip end portion of the inner circumferential groove is communicated with the predetermined hydraulic pressure chamber. Accordingly, even while the hydraulic pressure chambers that are adjacent to each other in the circumferential direction sandwiching the mesh position of the inner peripheral teeth and the outer peripheral teeth are maintained in a predetermined oil-tight state by the meshing of the inner peripheral teeth and the outer peripheral teeth, the hydraulic pressure inside the predetermined hydraulic pressure chamber is able to escape to the high pressure discharge passage through the outer circumferential groove or the inner circumferential groove when the predetermined hydraulic pressure chamber passes between the high pressure discharge passage and the low pressure discharge passage.

Also, in the vehicular internal gear type oil pump according to the first aspect, the high pressure discharge passage may be provided in front of, in the rotational direction, the low pressure discharge passage, and the spill passage may include at least one of an outer circumferential groove or an inner circumferential groove, in which, when the entire predetermined hydraulic pressure chamber is positioned between the low pressure discharge passage and the high pressure discharge passage, the outer circumferential groove extends in the circumferential direction rearward in the rotational direction from a radially outer side of a mesh position of the inner peripheral teeth and the outer peripheral teeth of a rear end surface in the rotational direction of the high pressure discharge passage, and a tip end portion of the outer circumferential groove is communicated with the predetermined hydraulic pressure chamber, and the inner circumferential groove extends in the circumferential direction rearward in the rotational direction from a radially inner side of the mesh position of the inner peripheral teeth and the outer peripheral teeth of the rear end surface in the radial direction of the high pressure discharge passage, and a tip end portion of the inner circumferential groove is communicated with the predetermined hydraulic pressure chamber.

According to this structure, the high pressure discharge passage is provided in front of, in the rotational direction of the hydraulic pressure chamber, the low pressure discharge passage. Also, the spill passage is formed by at least one of the outer circumferential groove or the inner circumferential groove, in which, when the entire predetermined hydraulic pressure chamber, from among the plurality of hydraulic pressure chambers, is positioned between the high pressure discharge passage and the low pressure discharge passage, the outer circumferential groove extends in the circumferential direction rearward in the rotational direction from a radially outer side of a mesh position of the inner peripheral teeth and the outer peripheral teeth of a rear end surface in the rotational direction of the high pressure discharge passage, and a tip end portion of the outer circumferential groove is communicated with the predetermined hydraulic pressure chamber, and the inner circumferential groove extends in the circumferential direction rearward in the rotational direction from a radially inner side of the mesh position of the inner peripheral teeth and the outer peripheral teeth of the rear end surface in the rotational direction of the high pressure discharge passage, and a tip end portion of the inner circumferential groove is communicated with the predetermined hydraulic pressure chamber. Accordingly, even while the hydraulic pressure chambers that are adjacent to each other in the circumferential direction sandwiching the mesh position of the inner peripheral teeth and the outer peripheral teeth are maintained in a predetermined oil-tight state by the meshing of the inner peripheral teeth and the outer peripheral teeth, the hydraulic pressure inside the predetermined hydraulic pressure chamber is able to escape to the high pressure discharge passage through the outer circumferential groove or the inner circumferential groove when the predetermined hydraulic pressure chamber passes between the high pressure discharge passage and the low pressure discharge passage.

In the vehicular internal gear type oil pump described above, the high pressure discharge passage may include a first high pressure discharge passage formed in a pump body, the low pressure discharge passage may include a first low pressure discharge passage formed in the pump body, the high pressure discharge passage may include a second high pressure discharge passage formed in a pump cover, and the low pressure discharge passage may include a second low pressure discharge passage formed in the pump cover.

A second aspect of the invention relates to a housing that includes the pump body and the pump cover described above.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a first example embodiment of the invention will be described in detail with reference to the accompanying drawings. Incidentally, the drawings described in the example embodiment below have been simplified or modified as appropriate, so the scale ratios and the shapes and the like of the portions are not always accurately depicted.

Figure 1:
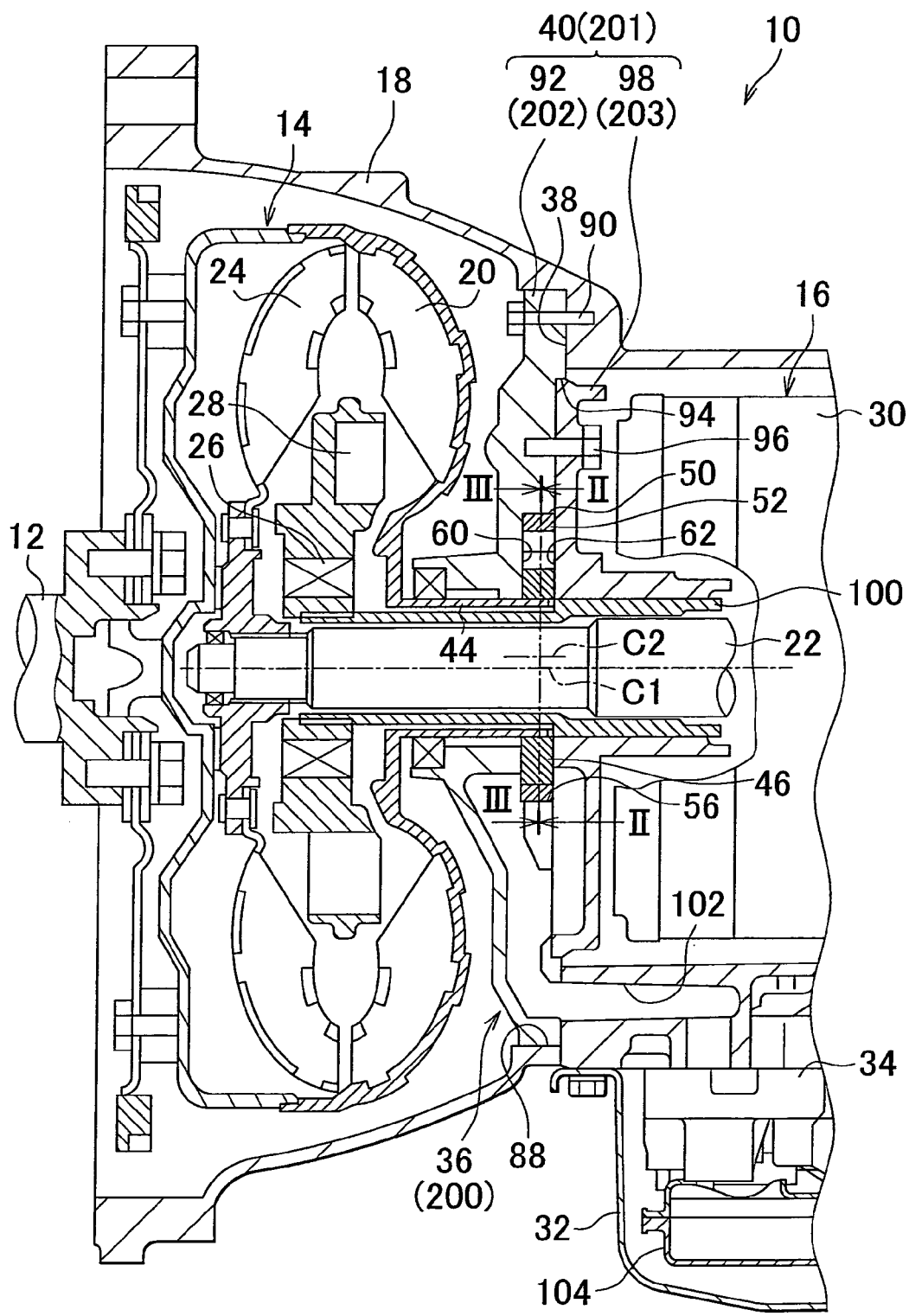
FIG. 1 is a sectional view of a portion of a vehicular power transmitting apparatus according to a first example embodiment of the invention.

FIG. 1 is a sectional view of a portion of a vehicular power transmitting apparatus 10 according to a first example embodiment of the invention. As shown in FIG. 1, the vehicular power transmitting apparatus 10 includes a torque converter 14 that is connected to a crankshaft 12 of an engine that serves as a driving source for running, and an automatic transmission 16 that is connected to this torque converter 14. The torque converter 14 and the automatic transmission 16 are housed in a cylindrical case 18 that is fixed to the engine. Torque output from the engine is transmitted to driving wheels, not shown, via the torque converter 14 and the automatic transmission 16, respectively.

The torque converter 14 is a well-known hydraulic power transmitting device that includes a pump impeller 20 that is connected to the crankshaft 12 of the engine, a turbine runner 24 that is connected to an input shaft 22 of the automatic transmission 16, and a stator 28 that is prevented from rotating in one direction by a one-way clutch 26; and that transmits power between the pump impeller 20 and the turbine runner 24 via fluid.

The automatic transmission 16 is provided with a well-known gear change mechanism 30 that has a plurality of planetary gear sets provided between the input shaft 22 and an output shaft, not shown, and a plurality of hydraulic friction engagement devices that switch the rotation speed ratio between the input shaft 22 and the output shaft by selectively coupling structural elements of the planetary gear sets together or coupling those structural elements to a non-rotating member. Also, the automatic transmission 16 is provided with a well-known hydraulic control circuit 34 and an oil pump 36. The hydraulic control circuit 34 is housed in an oil pan 32 fixed to a lower portion of the cylindrical case 18 and executes shift control of the automatic transmission 16 by adjusting the degree of engagement of the plurality of hydraulic friction engagement devices of the gear change mechanism 30, which is accomplished by regulating the hydraulic pressure supplied to these hydraulic friction engagement devices. The oil pump 36 is provided between the torque converter 14 and the gear change mechanism 30, and is used to draw up hydraulic fluid that has flowed back into the oil pan 32, and deliver it to the hydraulic control circuit 34 and the gear change mechanism 30 and the like, for example. This oil pump 36 corresponds to the vehicular internal gear type oil pump of the invention.

Figure 2:
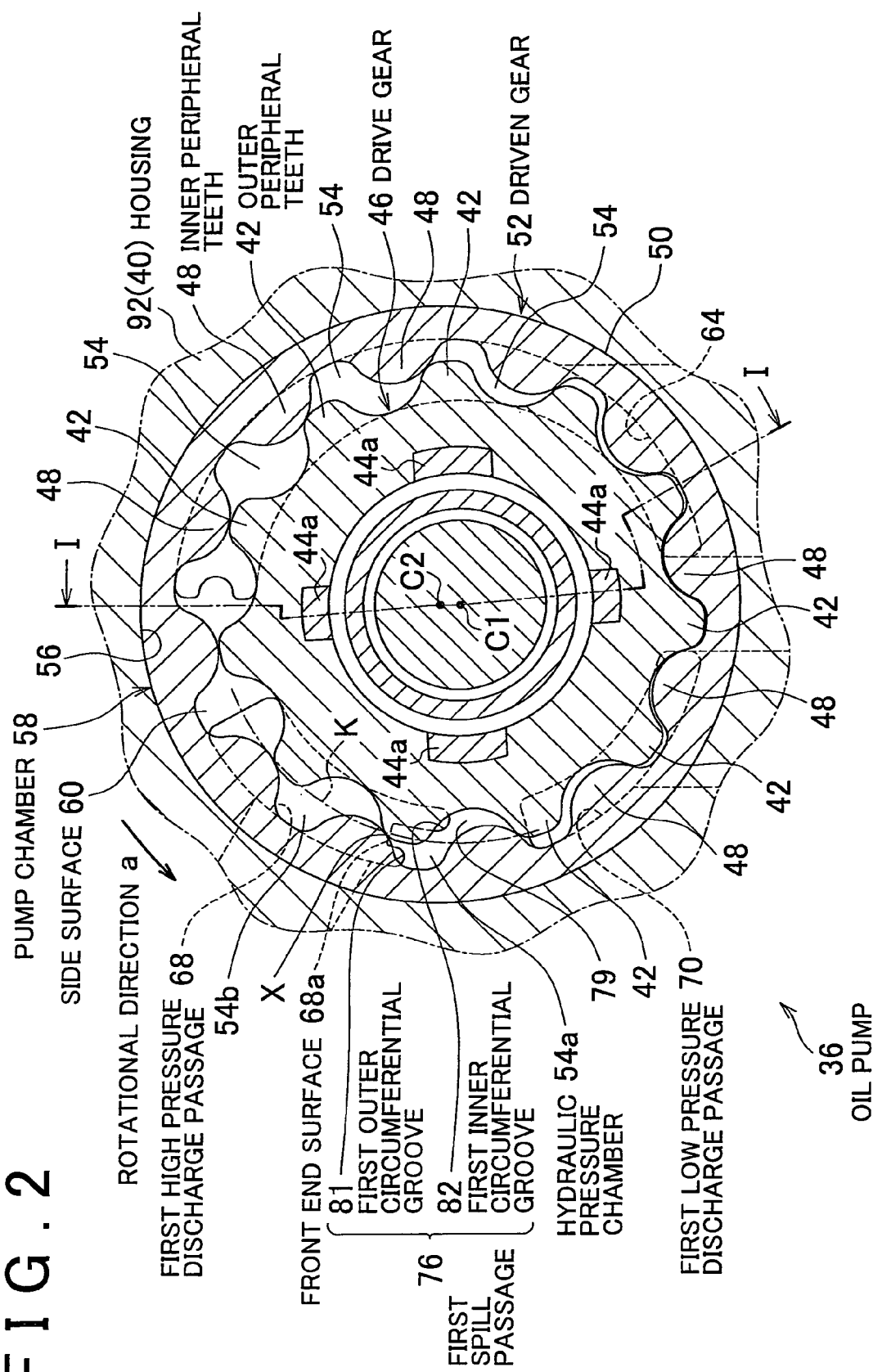
FIG. 2 is a sectional view of a section taken along line II-II in FIG. 1, and shows a state in which a hydraulic pressure chamber and a first high pressure discharge passage are communicated by a first spill passage.
Figure 3:
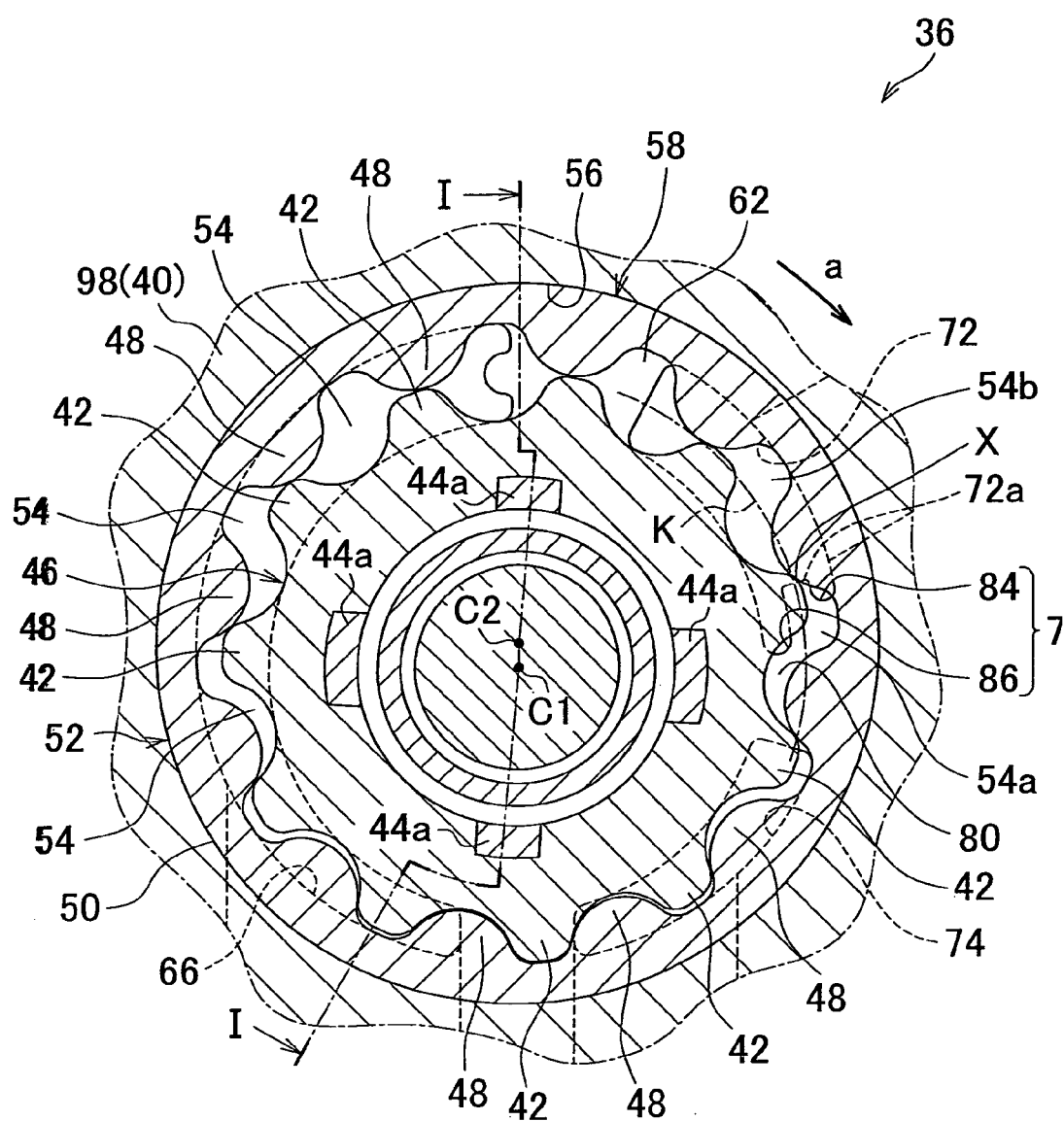
FIG. 3 is a sectional view of a section taken along line III-III in FIG. 1, and shows a state in which the hydraulic pressure chamber and a second high pressure discharge passage are communicated by a second spill passage.

FIG. 2 is a sectional view of a section taken along line II-II in FIG. 1, and FIG. 3 is a sectional view of a section taken along line III-III in FIG. 1. As shown in FIGS. 1 to 3, the oil pump 36 is a so-called internal gear type oil pump that includes a housing 40, a drive gear 46, and an annular driven gear 52. The housing 40 is fixed to a stepped end surface 38 formed on an inner peripheral surface of the cylindrical case 18, between the torque converter 14 and the automatic transmission 16. The drive gear 46 has 11 outer peripheral teeth 42 and is engaged with a plurality of pawl portions 44a of a tip end portion of a cylindrical pump shaft 44 that protrudes in the direction of an axis (one axial center) C1 from an inner peripheral end portion of the pump impeller 20, and is housed inside the housing 40 in a manner so as to be able to rotate about the axis C1 together with the pump shaft 44. The annular driven gear 52 has 12 inner peripheral teeth 48 that are in mesh with the outer peripheral teeth 42, and a cylindrical outer peripheral surface 50, and is housed inside the housing 40 in a manner so as to be able to rotate about an offset axis C2 that is offset from the axis C1, and that is rotatably driven by the drive gear 46.

The outer peripheral teeth 42 of the drive gear 46 and the inner peripheral teeth 48 of the annular driven gear 52 are in mesh with each other on the lower side, as shown in FIG. 2. Also, the drive gear 46 is rotatably driven in a rotational direction indicated by arrow a in FIG. 2 about the axis C1 by the pump shaft 44, and the annular driven gear 52 is rotatably driven in a rotational direction indicated by arrow a in FIG. 2 about the offset axis C2 by the drive gear 46. The outer peripheral teeth 42 move in the rotational direction faster than the inner peripheral teeth 48, in a state either slidably contacting, or with a predetermined slight gap between, the inner peripheral teeth 48 that are adjacent in front in the rotational direction, as the drive gear 46 and the annular driven gear 52 rotate. Also, when the outer peripheral teeth 42 that are in mesh with the inner peripheral teeth 48 on the lower side shown in FIG. 2 are rotated about the axis C1, they come to be in mesh with the inner peripheral teeth 48 that are adjacent to, in front of in the rotational direction, those inner peripheral teeth 48.

Figure 4:
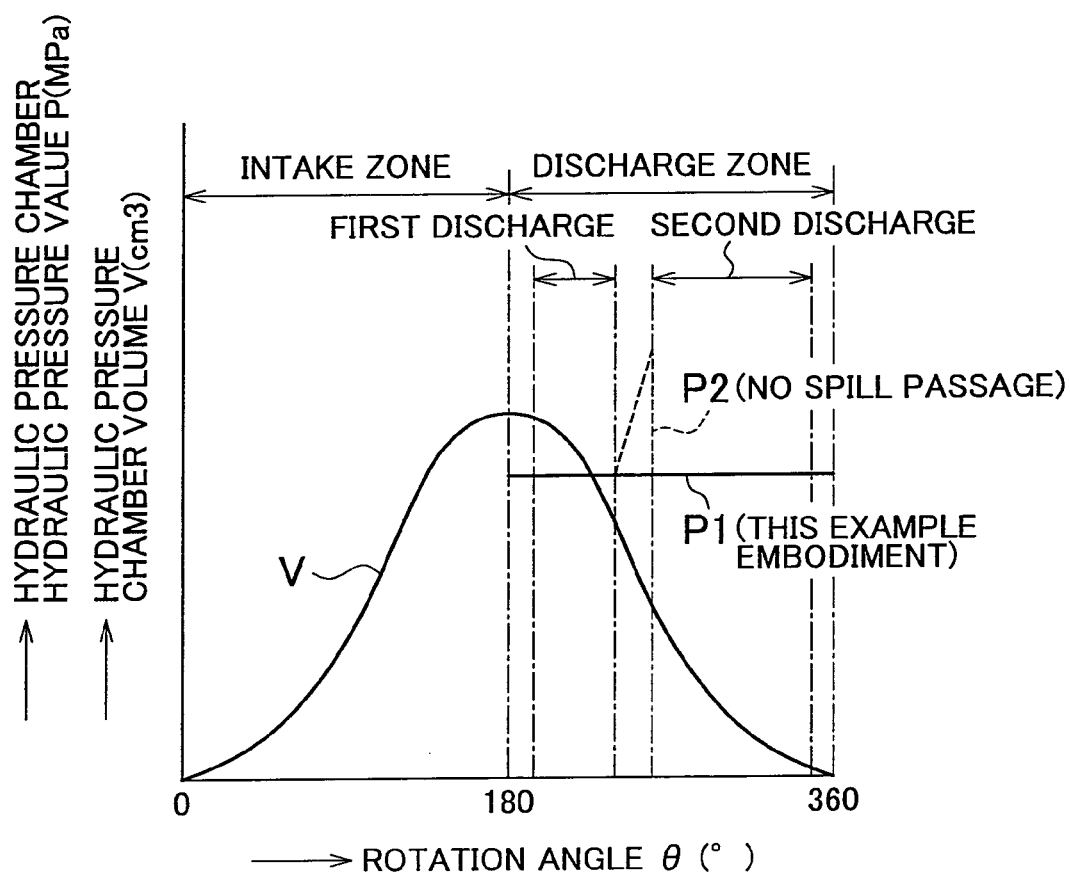
FIG. 4 is a view of the relationship between the rotation angle about an axis of the hydraulic pressure chamber and the volume of this hydraulic pressure chamber.

In FIGS. 2 and 3, a plurality (11 in this example embodiment) of hydraulic pressure chambers 54 that are formed in the circumferential direction by mesh gaps between the outer peripheral teeth 42 and the inner peripheral teeth 48 move in the rotational direction as the drive gear 46 and the annular driven gear 52 rotate. FIG. 4 is a view of the relationship between the rotation angle θ of a given hydraulic pressure chamber 54 about the axis C1 and the volume V of that hydraulic pressure chamber 54. In FIG. 4, 0° (360°) of rotation angle θ of the hydraulic pressure chamber 54 shown on the horizontal axis represents a circumferential position in which the outer peripheral teeth 42 and the inner peripheral teeth 48 positioned on the lower side in FIG. 2 are in mesh. As shown in FIG. 4, the hydraulic pressure chamber volume V increases as the hydraulic pressure chamber 54 moves in the rotational direction from the circumferential position where the rotation angle θ is 0°, and is largest when the hydraulic pressure chamber 54 is positioned at the circumferential position where the rotation angle θ is 180°. Also, the hydraulic pressure chamber volume V decreases as the hydraulic pressure chamber 54 moves in the rotational direction from the circumferential position where the rotation angle θ is 180°, and is smallest when the hydraulic pressure chamber 54 is positioned at the circumferential position where the rotation angle θ is 360°.

The housing 40 includes a pump chamber 58, a first intake passage 64 and a second intake passage 66, a first high pressure discharge passage 68 and a first low pressure discharge passage 70, and a second high pressure discharge passage 72 and a second low pressure discharge passage 74. The pump chamber 58 houses the driven gear 52 and the drive gear 46; and has a cylindrical inner peripheral surface 56 that is fit together with the outer peripheral surface 50 of the annular driven gear 52. The first intake passage 64 and the second intake passage 66 are open to a side surface 60 (see FIG. 2) on the torque converter 14 side of the pump chamber 58 and a side surface 62 (see FIG. 3) on the gear change mechanism 30 side of the pump chamber 58, respectively, in order to draw fluid into the pump chamber 58. The first high pressure discharge passage 68 and the first low pressure discharge passage 70 are both open, a predetermined distance apart from one another in the circumferential direction, to the side surface 60 of the pump chamber 58, as shown in FIG. 2, to discharge fluid from within the pump chamber 58. The second high pressure discharge passage 72 and the second low pressure discharge passage 74 are both open, a predetermined distance apart from one another in the circumferential direction, to the side surface 62 of the pump chamber 58, as shown in FIG. 3, to discharge fluid from within the pump chamber 58. Open edges of these passages are shown by solid lines or broken lines in FIGS. 2 and 3.

The first intake passage 64 and the second intake passage 66 are open to the pump chamber 58 in a circumferential range where the volume V of the hydraulic pressure chamber 54 increases as the hydraulic pressure chamber 54 moves in the rotational direction, i.e., in a predetermined intake zone where the rotation angle θ is 12° to 178°, inclusive, for example, within an intake zone where the rotation angle θ of the hydraulic pressure chamber 54 is 0° to 180°, inclusive, as shown in FIG. 4. Accordingly, when the hydraulic pressure chamber 54 moves in the rotational direction as the drive gear 46 and the annular driven gear 52 rotate, the hydraulic pressure chamber 54 becomes communicated with the first intake passage 64 and the second intake passage 66 in the process in which the volume V of the hydraulic pressure chamber 54 is increased.

The first high pressure discharge passage 68 and the second high pressure discharge passage 72 are open to the pump chamber 58 in a circumferential range where the volume V of the hydraulic pressure chamber 54 decreases as the hydraulic pressure chamber 54 moves in the rotational direction, i.e., in a first discharge zone where the rotation angle θ is 205° to 252°, inclusive, for example, within a discharge zone where the rotation angle θ of the hydraulic pressure chamber 54 is 180° to 360°, inclusive, as shown in FIG. 4. Accordingly, when the hydraulic pressure chamber 54 moves in the rotational direction as the drive gear 46 and the annular driven gear 52 rotate, the hydraulic pressure chamber 54 becomes communicated with the first high pressure discharge passage 68 and the second high pressure discharge passage 72 in the first half of the process in which the volume V of the hydraulic pressure chamber 54 is reduced.

The first low pressure discharge passage 70 and the second low pressure discharge passage 74 are open to the pump chamber 58 in a circumferential range where the volume V of the hydraulic pressure chamber 54 decreases as the hydraulic pressure chamber 54 moves in the rotational direction, i.e., in a second discharge zone where the rotation angle θ is 285° to 347°, inclusive, for example, within a discharge zone where the rotation angle θ of the hydraulic pressure chamber 54 is 180° to 360°, inclusive, as shown in FIG. 4. Accordingly, when the hydraulic pressure chamber 54 moves in the rotational direction as the drive gear 46 and the annular driven gear 52 rotate, the hydraulic pressure chamber 54 becomes communicated with the first low pressure discharge passage 70 and the second low pressure discharge passage 74 in the last half of the process in which the volume V of the hydraulic pressure chamber 54 is reduced.

The first high pressure discharge passage 68 and the second high pressure discharge passage 72 are provided behind, in the rotational direction, the first low pressure discharge passage 70 and the second low pressure discharge passage 74. Here, the first high pressure discharge passage 68 and the first low pressure discharge passage 70 are provided such that when the hydraulic pressure chamber 54 moves in the rotational direction, the state changes from one in which the hydraulic pressure chamber 54 is communicated with the first high pressure discharge passage 68, to one in which the hydraulic pressure chamber 54 is cut off from both the first high pressure discharge passage 68 and the first low pressure discharge passage 70, and then to one in which the hydraulic pressure chamber 54 is communicated with the first low pressure discharge passage 70. This is also the same for the second high pressure discharge passage 72 and the second low pressure discharge passage 74.

Also, as shown in FIGS. 2 and 3, the housing 40 includes a first spill passage 76 that is arranged on the side surface 60 of the pump chamber 58 and a second spill passage 78 that is arranged on the side surface 62 of the pump chamber 58. The first spill passage 76 is designed to communicate a predetermined hydraulic pressure chamber 54a, from among the plurality of hydraulic pressure chambers 54, with the first high pressure discharge passage 68 when the entire predetermined hydraulic pressure chamber 54a is positioned between the opening of the first high pressure discharge passage 68 and the opening of the first low pressure discharge passage 70, and thus not communicated with these discharge passages. Similarly, the second spill passage 78 is designed to communicate the predetermined hydraulic pressure chamber 54a with the second high pressure discharge passage 72 when the entire predetermined hydraulic pressure chamber 54a is positioned between the opening of the second high pressure discharge passage 72 and the opening of the second low pressure discharge passage 74, and thus not communicated with these discharge passages. The predetermined hydraulic pressure chamber 54a, from among the hydraulic pressure chambers 54, refers to an oil-tight momentary chamber that is sandwiched from the direction of the axis C1 by a wall surface 79 (see FIG. 2) between the opening of the first high pressure discharge passage 68 and the opening of the first low pressure discharge passage 70, and a wall surface 80 (see FIG. 3) between the opening of the second high pressure discharge passage 72 and the opening of the second low pressure discharge passage 74.

As shown in FIG. 2, the first spill passage 76 is formed by a first outer circumferential groove 81 and a first inner circumferential groove 82, in which, when the entire predetermined hydraulic pressure chamber 54a is positioned between the first high pressure discharge passage 68 and the first low pressure discharge passage 70, the first outer circumferential groove 81 extends in the circumferential direction forward in the rotational direction from a radially outer side of a trajectory K of a mesh position X that is the closest proximal point or the contact point between the inner peripheral teeth 48 and the outer peripheral teeth 42 of a front end surface 68a in the rotational direction of the first high pressure discharge passage 68, and a tip end portion of the first outer circumferential groove 81 is communicated with the predetermined hydraulic pressure chamber 54a, and the first inner circumferential groove 82 extends in the circumferential direction forward in the rotational direction from a radially inner side of the trajectory K of the mesh position X of the inner peripheral teeth 48 and the outer peripheral teeth 42 of the front end surface 68a, and a tip end portion of the first inner circumferential groove 82 is communicated with the predetermined hydraulic pressure chamber 54a.

As shown in FIG. 3, the second spill passage 78 is formed by a second outer circumferential groove 84 and a second inner circumferential groove 86, in which, when the entire predetermined hydraulic pressure chamber 54a is positioned between the second high pressure discharge passage 72 and the second low pressure discharge passage 74, the second outer circumferential groove 84 extends in the circumferential direction forward in the rotational direction from a radially outer side of a trajectory K of a mesh position X that is the closest proximal point or the contact point between the inner peripheral teeth 48 and the outer peripheral teeth 42 of a front end surface 72a in the rotational direction of the second high pressure discharge passage 72, and a tip end portion of the second outer circumferential groove 84 is communicated with the predetermined hydraulic pressure chamber 54a, and the second inner circumferential groove 86 extends in the circumferential direction forward in the rotational direction from a radially inner side of the trajectory K of the mesh position X of the inner peripheral teeth 48 and the outer peripheral teeth 42 of the front end surface 72a, and a tip end portion of the second inner circumferential groove 86 is communicated with the predetermined hydraulic pressure chamber 54a.

Here, the housing 40 has a pump body 92 and a pump cover 98, as shown in FIG. 1. The pump body 92 is fixed by a plurality of bolts 90 while fitted together with a cylindrical inner peripheral surface 88 of the cylindrical case 18. The pump cover 98 is fixed by a plurality of bolts 96 while fitted inside of an insertion hole 94 that is formed shallow and having a relatively large diameter in an end surface on the gear change mechanism 30 side of the pump body 92. The cylindrical inner peripheral surface 56 is the inner peripheral surface of a closed-end cylindrical hole formed on the bottom surface of the insertion hole 94. Also, the side surface 60 of the pump chamber 58 is the bottom surface of the closed-end cylindrical hole, and the side surface 62 is the end surface on the pump body 92 side of the pump cover 98. The pump chamber 58 is formed by a space that is surrounded by the closed-end cylindrical hole and the end surface on the pump body 92 side of the pump cover 98. One end of a cylindrical stator shaft 100 is connected to the stator 28 via the one-way clutch 26, and the other end of the stator shaft 100 is integrally fitted together with the inner peripheral surface of the pump cover 98. The input shaft 22 of the automatic transmission 16 is provided passing through the stator shaft 100, on the inner peripheral side of the stator shaft 100.

The first intake passage 64, the first high pressure discharge passage 68, and the first low pressure discharge passage 70 shown in FIGS. 2 and 3 are formed in the pump body 92. Also, the second intake passage 66, the second high pressure discharge passage 72, and the second low pressure discharge passage 74 are formed in the pump cover 98. Further, the first intake passage 64 and the second intake passage 66 are connected together and are communicated with an oil reservoir space inside the oil pan 32 via both a first passage 102 formed in the cylindrical case 18, and a strainer 104, as shown in FIG. 1.

Figure 5:
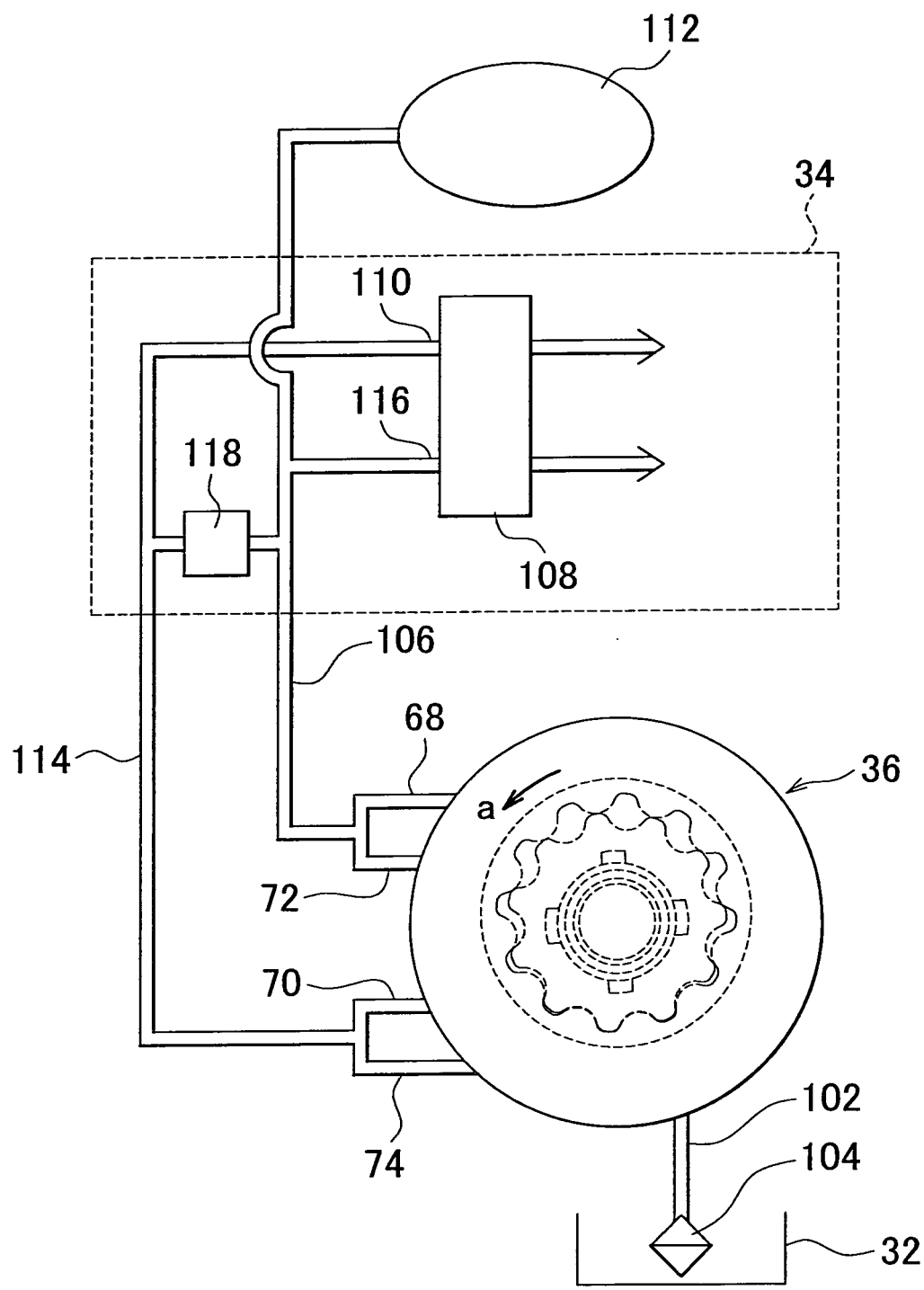
FIG. 5 is a view showing a frame format of one example of the structure of a hydraulic control circuit to which hydraulic pressure is supplied from each discharge passage of an oil pump.

FIG. 5 is a view showing a frame format of one example of the structure of the hydraulic control circuit 34 to which hydraulic pressure is supplied from each discharge passage of the oil pump 36. In FIG. 5, the first high pressure discharge passage 68 and the second high pressure discharge passage 72 of the oil pump 36 are connected together, and are also connected to a first input port 116 of a well-known relief-type regulator 108, for example, provided inside the hydraulic control circuit 34 via a second passage 106 formed in the cylindrical case 18, for example, as well as connected to a hydraulically actuated apparatus 112 that includes the plurality of hydraulic friction engagement devices of the gear change mechanism 30 and the like, for example. Also, the first low pressure discharge passage 70 and the second low pressure discharge passage 74 of the oil pump 36 are connected together, and are also connected to a second input port 110 of the regulator 108 of the hydraulic control circuit 34 via a third passage 114 formed in the cylindrical case 18, for example.

Figure 6:
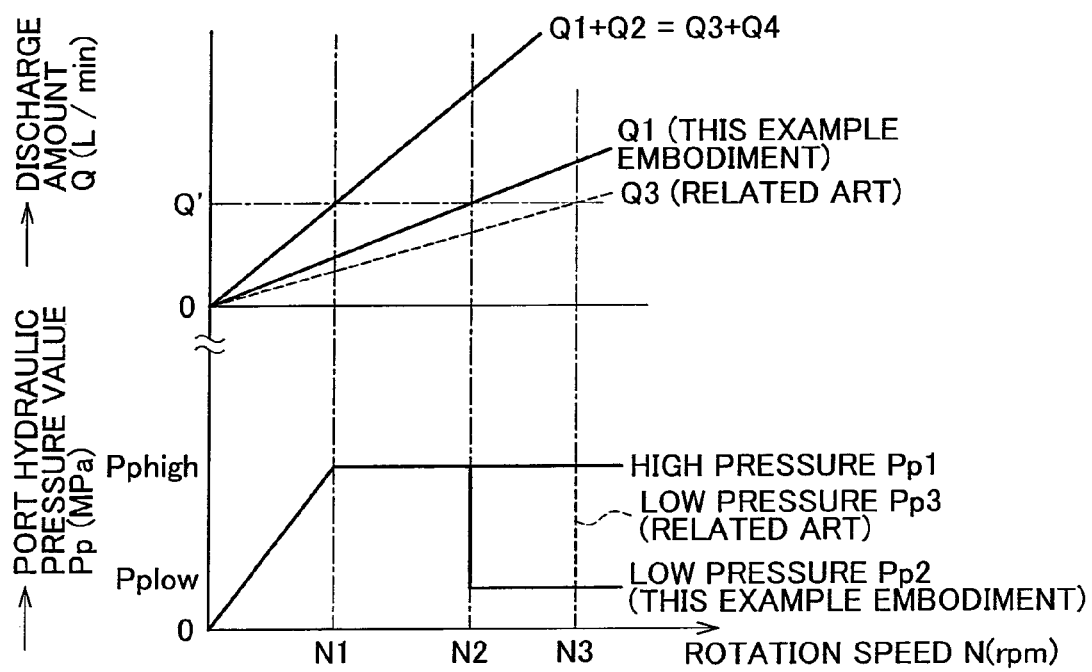
FIG. 6 is a view of the relationship between the rotation speed of a drive gear, and the discharge amount and hydraulic pressure value of each discharge passage.

The hydraulic pressure value of the hydraulic fluid supplied to the hydraulically actuated apparatus 112 is regulated by adjusting the relief amount of the hydraulic fluid the regulator 108. More specifically, when the rotation speed N of the drive gear 46 is equal to or less than a predetermined rotation speed N1 set in advance and the hydraulic pressure value of the hydraulic fluid discharged from the high pressure discharge passages, i.e., a high pressure port hydraulic pressure value Pp1, is equal to or less than a predetermined high hydraulic pressure value Pphigh set in advance, the hydraulic fluid supplied to the hydraulically actuated apparatus 112 is used at the current hydraulic pressure value, as shown in the lower part of FIG. 6. When the rotation speed N is greater than the predetermined rotation speed N1 and the high pressure port hydraulic pressure value Pp1 is about to exceed the high hydraulic pressure value Pphigh, the hydraulic fluid supplied to the hydraulically actuated apparatus 112 is regulated to the high hydraulic pressure value Pphigh by the regulator 108 and then used. Here, the upper part of FIG. 6 shows the discharge amount Q of the hydraulic fluid from the discharge passages of the oil pump 36. As shown in FIG. 6, the total discharge amount of the hydraulic fluid discharged from the first high pressure discharge passage 68 and the second high pressure discharge passage 72, i.e., a high pressure port discharge amount Q1, is proportional to the rotation speed N of the drive gear 46.

Also, when the rotation speed N of the drive gear 46 is less than a predetermined rotation speed N2 set in advance, the second input port 110 of the regulator 108 is closed to increase the pressure of the hydraulic fluid supplied from the first low pressure discharge passage 70 and the second low pressure discharge passage 74 to the third passage 114, so that it becomes larger than the hydraulic pressure value inside the second passage 106. In response to this, the hydraulic fluid supplied from the first low pressure discharge passage 70 and the second low pressure discharge passage 74 to the third passage 114 is supplied to the second passage 106 via a one-way valve 118 provided between the third passage 114 and the second passage 106, and is used to operate the hydraulically actuated apparatus 112. The predetermined rotation speed N2 is the minimum rotation speed within a rotation speed range at which the necessary consumption amount Q' of relatively high pressure hydraulic fluid that is consumed by the hydraulically actuated apparatus 112 is satisfied by the high pressure port discharge amount Q1 alone. Also, when the rotation speed N is equal to or greater than the predetermined rotation speed N2, the hydraulic fluid supplied from the first low pressure discharge passage 70 and the second low pressure discharge passage 74 to the third passage 114 is maintained by the regulator 108 at a predetermined low hydraulic pressure value Pplow set in advance. Incidentally, as shown in the upper part of FIG. 6, the total discharge amount of the hydraulic fluid that is discharged from the first low pressure discharge passage 70 and the second low pressure discharge passage 74, i.e., a low pressure port discharge amount Q2, is proportional to the rotation speed N of the drive gear 46.

With the oil pump 36 structured as described above, when the drive gear 46 and the annular driven gear 52 rotate in the rotational direction, fluid stored in the oil pan 32 is drawn through the strainer 104 and the first passage 102 into the hydraulic pressure chamber 54 that moves through the circumferential range where the volume V increases. Also, fluid that has been drawn in and pressurized is delivered to the hydraulic control circuit 34 through the second passage 106 from the hydraulic pressure chamber 54 that moves through the circumferential range where the first high pressure discharge passage 68 and the second high pressure discharge passage 72 open, within the circumferential range where the volume V decreases. Also, fluid that has been drawn in and pressurized is delivered to the hydraulic control circuit 34 through the third passage 114 from the hydraulic pressure chamber 54 that moves through the circumferential range where the first low pressure discharge passage 70 and the second low pressure discharge passage 74 open, within the circumferential range where the volume V decreases.

Figure 7:
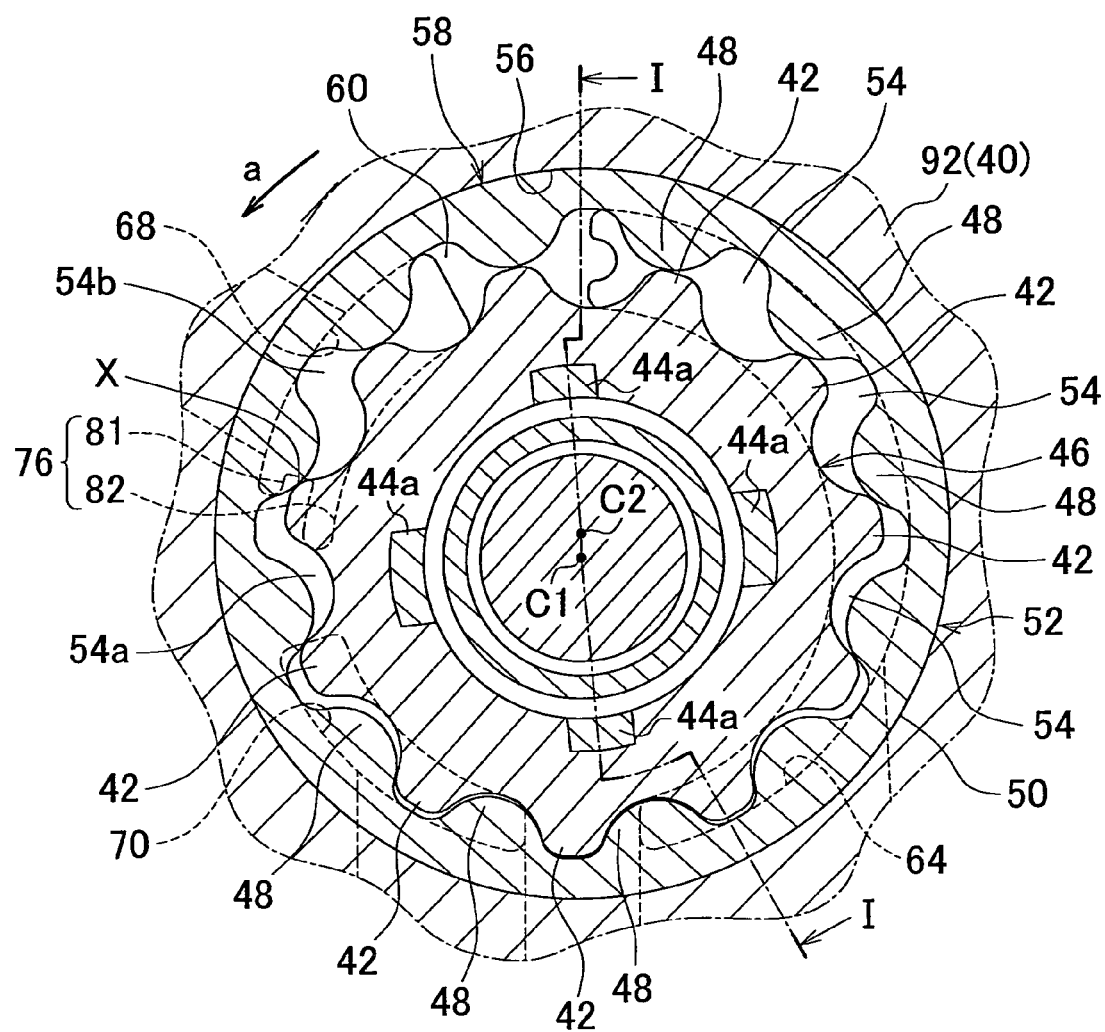
FIG. 7 is an oil pump sectional view that corresponds to FIG. 2, and that shows a state in which the hydraulic pressure chamber is cut off from the high pressure discharge passages and the low pressure discharge passages.

Here, when the predetermined hydraulic pressure chamber 54a moves in the rotational direction and that predetermined hydraulic pressure chamber 54a passes between the first high pressure discharge passage 68 and the first low pressure discharge passage 70 (and between the second high pressure discharge passage 72 and the second low pressure discharge passage 74), the state changes from one in which the predetermined hydraulic pressure chamber 54a is directly communicated with the first high pressure discharge passage 68 and the second high pressure discharge passage 72, to one in which the predetermined hydraulic pressure chamber 54a is communicated with the first high pressure discharge passage 68 and the second high pressure discharge passage 72 via the first spill passage 76 and the second spill passage 78, respectively, as shown in FIGS. 2 and 3, then to one in which the predetermined hydraulic pressure chamber 54a is cut off from the high pressure discharge hydraulic passages and the low pressure discharge passages, as shown in FIG. 7, and then to one in which the predetermined hydraulic pressure chamber 54a becomes communicated with the first low pressure discharge passage 70 and the second low pressure discharge passage 74.

As shown in FIGS. 2 and 3, when the predetermined hydraulic pressure chamber 54a is communicated with the first high pressure discharge passage 68 and the second high pressure discharge passage 72 via the first spill passage 76 and the second spill passage 78, respectively, the hydraulic pressure value inside the predetermined hydraulic pressure chamber 54a is maintained at the same value as the hydraulic pressure value inside the first high pressure discharge passage 68 and the second high pressure discharge passage 72. At this time, the hydraulic pressure value inside the predetermined hydraulic pressure chamber 54a is substantially the same as the hydraulic pressure value inside a predetermined hydraulic pressure chamber 54b that is adjacent to, and behind in the rotational direction, the predetermined hydraulic pressure chamber 54a, and that is communicated with the first high pressure discharge passage 68 and the second high pressure discharge passage 72. Therefore, fluid is inhibited from flowing from the predetermined hydraulic pressure chamber 54b into the predetermined hydraulic pressure chamber 54a through the closest proximal point or the contact point (i.e., the tip clearance) between the inner peripheral teeth 48 and the outer peripheral teeth 42 that are in mesh between the predetermined hydraulic pressure chamber 54a and the predetermined hydraulic pressure chamber 54b and that define those chambers.

Incidentally, one typical oil pump is configured without the first spill passage 76 and the second spill passage 78, and instead has a first spill groove formed on the side surface 60 of the pump chamber 58 and a second spill groove formed on the side surface 62 of the pump chamber 58, such that the predetermined hydraulic pressure chamber 54a is communicated with both the first low pressure discharge passage 70 and the second low pressure discharge passage 74 when the entire predetermined hydraulic pressure chamber 54a is positioned between the first high pressure discharge passage 68 and the first low pressure discharge passage 70. With such an oil pump, when the hydraulic pressure inside the first low pressure discharge passage 70 and inside the second low pressure discharge passage 74 is reduced to the predetermined low hydraulic pressure value Pplow, and the predetermined hydraulic pressure chamber 54a passes between the first high pressure discharge passage 68 and the first low pressure discharge passage 70, the hydraulic pressure inside the predetermined hydraulic pressure chamber 54a escapes into the first low pressure discharge passage 70 through the first spill groove and into the second low pressure discharge passage 74 through the second spill groove, so the hydraulic pressure value inside the predetermined hydraulic pressure chamber 54a is reduced to near the predetermined low hydraulic pressure value Pplow. Therefore, fluid flows through the closest proximal point or the contact point (i.e., the tip clearance) between the inner peripheral teeth 48 and the outer peripheral teeth 42 due to the increased difference between the hydraulic pressure value inside the predetermined hydraulic pressure chamber 54a and the hydraulic pressure value inside the predetermined hydraulic pressure chamber 54b that is adjacent to the predetermined hydraulic pressure chamber 54a, and then flows into the predetermined hydraulic pressure chamber 54a from the first high pressure discharge passage 68 and the second high pressure discharge passage 72 through the predetermined hydraulic pressure chamber 54b. As a result, the distribution ratio of a high pressure port discharge amount Q3 and a low pressure port discharge amount Q4 changes, as shown by the broken line in the upper part of FIG. 6, such that the volumetric efficiency on the high pressure discharge side decreases which is problematic. Also, the high pressure port discharge amount Q3 decreases and the minimum rotation speed N at which the predetermined necessary consumption amount Q' is satisfied by the high pressure port discharge amount Q3 alone increases, and the switching rotation speed that switches a low pressure port hydraulic pressure value Pp3 to the predetermined low hydraulic pressure value Pplow increases to a predetermined rotation speed N3. As a result, the switching performance of the hydraulic pressure value of the low pressure discharge hydraulic passage for reducing the driving torque of the oil pump may decrease.

Incidentally, with a structure in which neither the first spill passage 76 and the second spill passage 78 are provided, nor the first spill groove and the second spill groove that are provided in the related oil pump are provided, when the hydraulic pressure chamber 54 moves between the first high pressure discharge passage 68 and the first low pressure discharge passage 70, i.e., when the rotation angle θ of the hydraulic pressure chamber 54 is within a relatively large predetermined rotation angle range between the first discharge zone and the second discharge zone, as shown in FIG. 4, the hydraulic pressure chamber 54 is closed, so the hydraulic pressure value P2 inside the hydraulic pressure chamber 54 suddenly increases, as shown by the broken line in FIG. 4, and as a result, the driving torque of the oil pump may end up increasing. With respect to this, with the oil pump 36 of this example embodiment, when the rotation angle θ of the hydraulic pressure chamber 54 is between the first discharge zone and the second discharge zone, the hydraulic pressure chamber 54 is communicated with the first high pressure discharge passage 68 and the second high pressure discharge passage 72 via the first spill passage 76 and the second spill passage 78, respectively, at a large portion between the first discharge zone and the second discharge zone, so a hydraulic pressure chamber hydraulic pressure value P1 is kept substantially constant, as shown by the solid line in FIG. 4. The first spill passage 76 and the second spill passage 78 in this example embodiment function as spill grooves that prevent a sudden increase in pressure inside the hydraulic pressure chamber 54 when the hydraulic pressure chamber 54 moves between the first high pressure discharge passage 68 and the first low pressure discharge passage 70.

As described above, according to the oil pump 36 of this example embodiment, the first spill passage 76 is provided formed on the side surface 60 of the pump chamber 58 and the second spill passage 78 is provided formed on the side surface 62 of the pump chamber 58, to communicate the predetermined hydraulic pressure chamber 54a with the first high pressure discharge passage 68 and the second high pressure discharge passage 72, respectively, when the entire predetermined hydraulic pressure chamber 54a is positioned between the first high pressure discharge passage 68 and the first low pressure discharge passage 70. Therefore, when the hydraulic pressure inside the first low pressure discharge passage 70 and inside the second low pressure discharge passage 74 is reduced to the predetermined low hydraulic pressure value Pplow, and the predetermined hydraulic pressure chamber 54a passes between the first high pressure discharge passage 68 and the first low pressure discharge passage 70, the hydraulic pressure inside the predetermined hydraulic pressure chamber 54a escapes to the first high pressure discharge passage 68 and the second high pressure discharge passage 72 through the first spill passage 76 and the second spill passage 78, respectively, so the hydraulic pressure value inside the predetermined hydraulic pressure chamber 54a is maintained at the same value as the hydraulic pressure value inside the first high pressure discharge passage 68 and inside the second high pressure discharge passage 72. Therefore, the difference between the hydraulic pressure value inside the predetermined hydraulic pressure chamber 54a and the hydraulic pressure value inside the predetermined hydraulic pressure chamber 54b that is adjacent to the predetermined hydraulic pressure chamber 54a and that is communicated with the first high pressure discharge passage 68 and the second high pressure discharge passage 72 will not increase, so fluid is inhibited from flowing into the predetermined hydraulic pressure chamber 54a from the first high pressure discharge passage 68 and the second high pressure discharge passage 72 through the closest proximal point or the contact point (i.e., the tip clearance) between the inner peripheral teeth 48 and the outer peripheral teeth 42. As a result, the volumetric efficiency on the high pressure discharge side can be inhibited from decreasing, while the hydraulic pressure inside the hydraulic pressure chamber 54 is prevented from suddenly increasing.

Also, according to the oil pump 36 of this example embodiment, the first high pressure discharge passage 68 and the second high pressure discharge passage 72 are provided behind the first low pressure discharge passage 70 and the second low pressure discharge passage 74 in the rotational direction. Also, the first spill passage 76 is formed by the first outer circumferential groove 81 and the first inner circumferential groove 82, in which, when the entire predetermined hydraulic pressure chamber 54a is positioned between the first high pressure discharge passage 68 and the first low pressure discharge passage 70, the first outer circumferential groove 81 extends in the circumferential direction forward in the rotational direction from a radially outer side of a trajectory K of a mesh position X of the inner peripheral teeth 48 and the outer peripheral teeth 42 of a front end surface 68a in the rotational direction of the first high pressure discharge passage 68, and a tip end portion of the first outer circumferential groove 81 is communicated with the predetermined hydraulic pressure chamber 54a, and the first inner circumferential groove 82 extends in the circumferential direction forward in the rotational direction from a radially inner side of the trajectory K of the mesh position X of the inner peripheral teeth 48 and the outer peripheral teeth 42 of the front end surface 68a, and a tip end portion of the first inner circumferential groove 82 is communicated with the predetermined hydraulic pressure chamber 54a. The second spill passage 78 is formed by the second outer circumferential groove 84 and the second inner circumferential groove 86, in which, when the entire predetermined hydraulic pressure chamber 54a is positioned between the second high pressure discharge passage 72 and the second low pressure discharge passage 74, the second outer circumferential groove 84 extends in the circumferential direction forward in the rotational direction from a radially outer side of a trajectory K of a mesh position X of the inner peripheral teeth 48 and the outer peripheral teeth 42 of a front end surface 72a in the rotational direction of the second high pressure discharge passage 72, and a tip end portion of the second outer circumferential groove 84 is communicated with the predetermined hydraulic pressure chamber 54a, and the second inner circumferential groove 86 extends in the circumferential direction forward in the rotational direction from a radially inner side of the trajectory K of the mesh position X of the inner peripheral teeth 48 and the outer peripheral teeth 42 of the front end surface 72a, and a tip end portion of the second inner circumferential groove 86 is communicated with the predetermined hydraulic pressure chamber 54a. Accordingly, even while the predetermined hydraulic pressure chamber 54a and the predetermined hydraulic pressure chamber 54b that are adjacent in the circumferential direction sandwiching the mesh position X of the inner peripheral teeth 48 and the outer peripheral teeth 42 are maintained in a predetermined oil-tight state by the meshing of the inner peripheral teeth 48 and the outer peripheral teeth 42, the hydraulic pressure inside the predetermined hydraulic pressure chamber 54a is able to escape to the first high pressure discharge passage 68, and the second high pressure discharge passage 72 through the first spill passage 76 and the second spill passage 78, respectively, when the predetermined hydraulic pressure chamber 54a passes between the first high pressure discharge passage 68 and the first low pressure discharge passage 70.

Next, a second example embodiment of the invention will be described. Incidentally, in the following description of this second example embodiment, parts that overlap with parts in the first example embodiment described above will be denoted by like reference characters and descriptions of those parts will be omitted.

Figure 8:
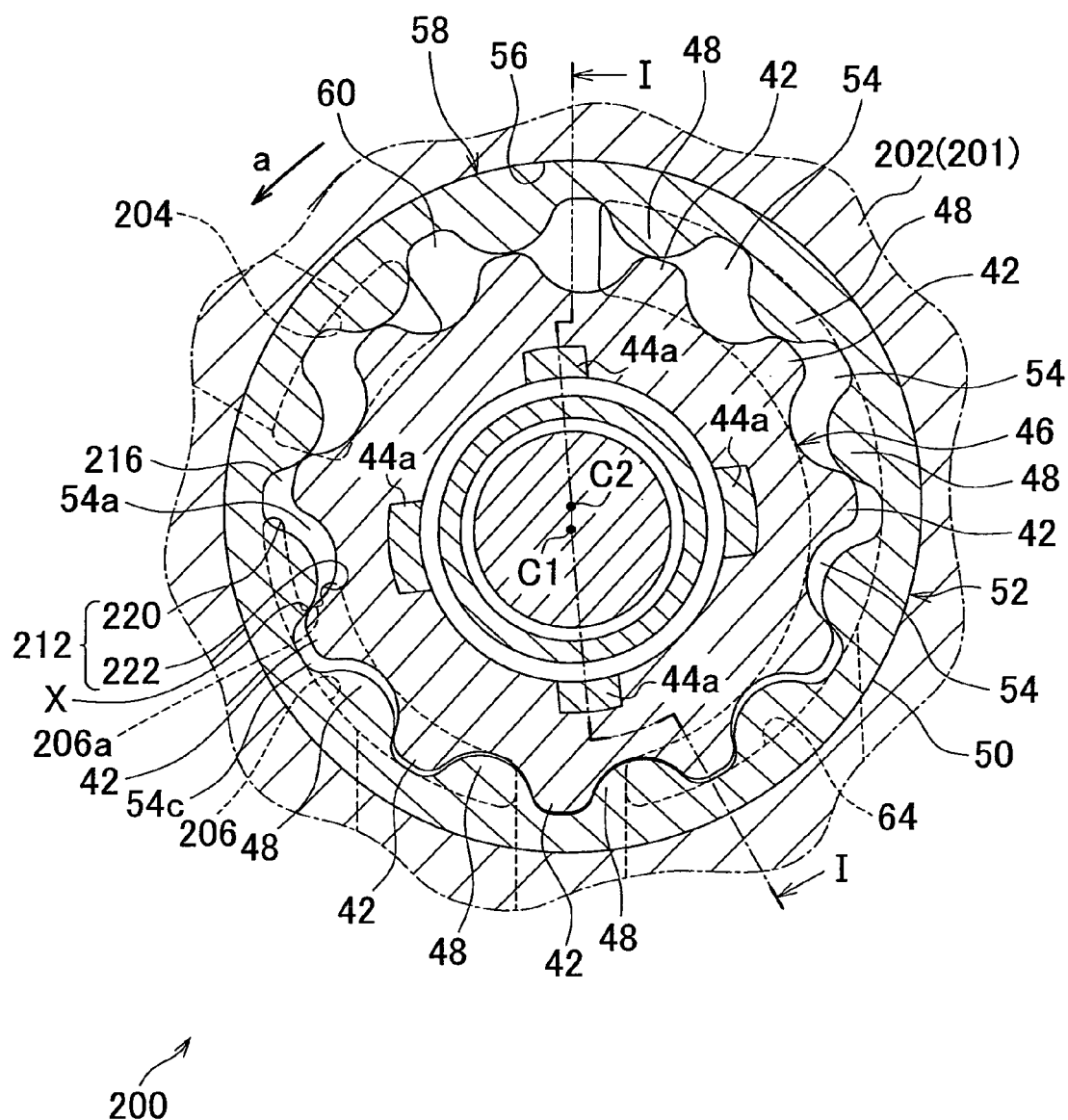
FIG. 8 is a sectional view of an oil pump according to a second example embodiment of the invention, that corresponds to FIG. 2 of the first example embodiment.
Figure 9:
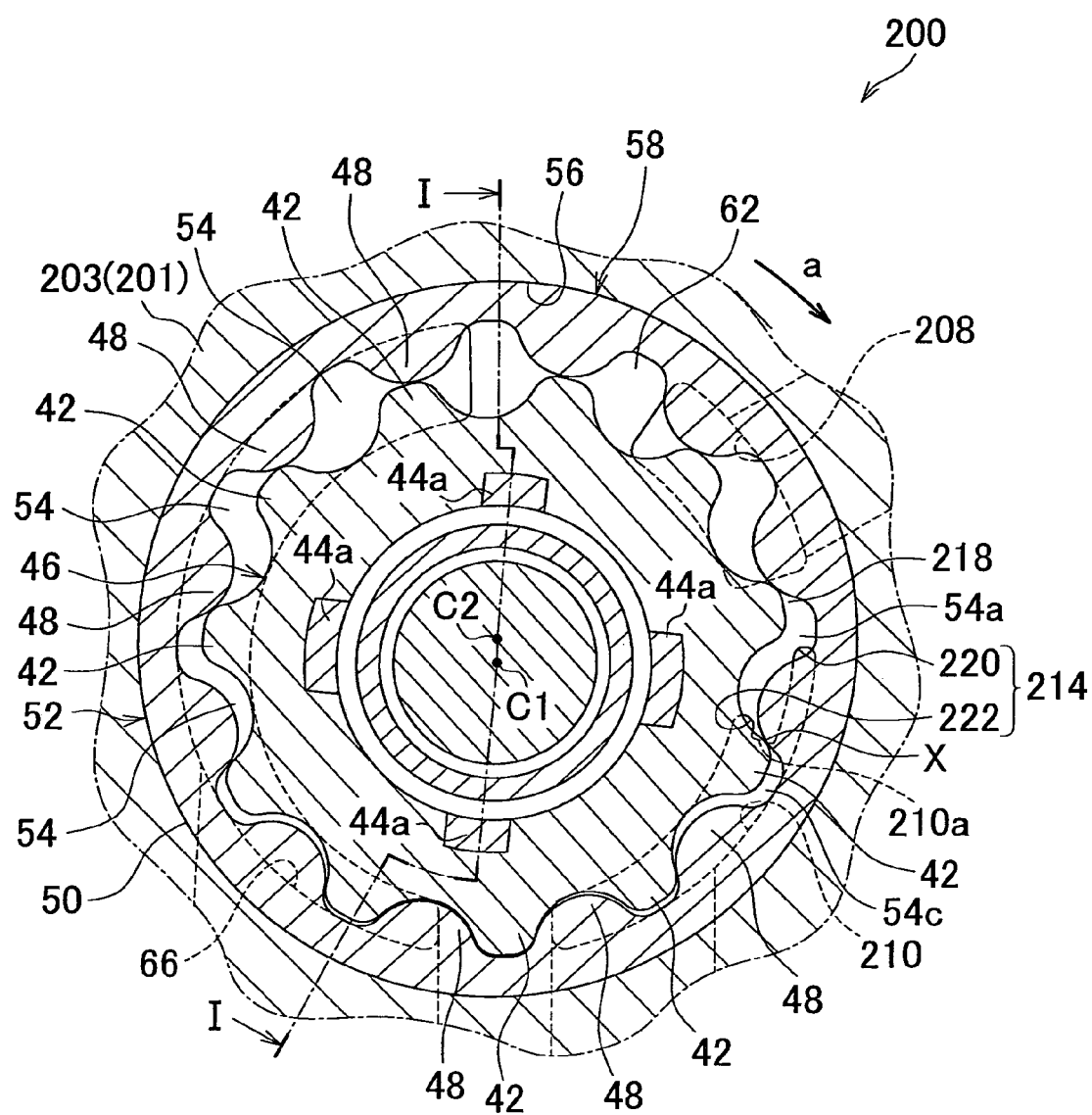
FIG. 9 is a sectional view of the oil pump according to the second example embodiment of the invention, that corresponds to FIG. 3 of the first example embodiment.

FIGS. 8 and 9 are sectional views of an oil pump 200 according to the second example embodiment of the invention, that correspond to FIGS. 2 and 3, respectively, of the first example embodiment. FIG. 8 is a sectional view of a section taken along line II-II in FIG. 1 that is a sectional view of the overall oil pump 200 and is common to the first example embodiment, and FIG. 9 is a sectional view of a section taken along line III-III in FIG. 1. In FIGS. 8 and 9, a housing 201 of the oil pump 200 is formed by fitting a pump body 202 and a pump cover 203 together. The housing 201 includes a first low pressure discharge passage 204 and a first high pressure discharge passage 206, and a second low pressure discharge passage 208 and a second high pressure discharge passage 210. The first low pressure discharge passage 204 and the first high pressure discharge passage 206 are both open, a predetermined distance apart from one another in the circumferential direction, to the side surface 60 of the pump chamber 58, as shown in FIG. 8, to discharge fluid from within the pump chamber 58. The second low pressure discharge passage 208 and the second high pressure discharge passage 210 are both open, a predetermined distance apart from one another in the circumferential direction, to the side surface 62 of the pump chamber 58, as shown in FIG. 9, to discharge fluid from within the pump chamber 58.

The first high pressure discharge passage 206 and the second high pressure discharge passage 210 are open to the pump chamber 58 in a circumferential range where the volume V of the hydraulic pressure chamber 54 decreases as the hydraulic pressure chamber 54 moves in the rotational direction, i.e., in a second discharge zone where the rotation angle θ is 285° to 347°, inclusive, for example, within a discharge zone where the rotation angle θ of the hydraulic pressure chamber 54 is 180° to 360°, inclusive. Accordingly, when the hydraulic pressure chamber 54 moves in the rotational direction as the drive gear 46 and the annular driven gear 52 rotate, the hydraulic pressure chamber 54 becomes communicated with the first high pressure discharge passage 206 and the second high pressure discharge passage 210 in the process in which the volume V of the hydraulic pressure chamber 54 is reduced.

The first low pressure discharge passage 204 and the second low pressure discharge passage 208 are open to the pump chamber 58 in a circumferential range where the volume V of the hydraulic pressure chamber 54 decreases as the hydraulic pressure chamber 54 moves in the rotational direction, i.e., in a first discharge zone where the rotation angle θ is 212° to 252°, inclusive, for example, within a discharge zone where the rotation angle θ of the hydraulic pressure chamber 54 is 180° to 360°, inclusive. Accordingly, when the hydraulic pressure chamber 54 moves in the rotational direction as the drive gear 46 and the annular driven gear 52 rotate, the hydraulic pressure chamber 54 becomes communicated with the first low pressure discharge passage 204 and the second low pressure discharge passage 208 in the process in which the volume V of the hydraulic pressure chamber 54 is reduced.

The first high pressure discharge passage 206 and the second high pressure discharge passage 210 are provided in front of, in the rotational direction, the first low pressure discharge passage 204 and the second low pressure discharge passage 208. Here, the first low pressure discharge passage 204 and the first high pressure discharge passage 206 are provided such that when the hydraulic pressure chamber 54 moves in the rotational direction, the state changes from one in which the hydraulic pressure chamber 54 is communicated with the first low pressure discharge passage 204, to one in which the hydraulic pressure chamber 54 is cut off from both the first low pressure discharge passage 204 and the first high pressure discharge passage 206, and then to one in which the hydraulic pressure chamber 54 is communicated with the first high pressure discharge passage 206. This is also the same for the second low pressure discharge passage 208 and the second high pressure discharge passage 210.

Also, the housing 201 includes a first spill passage 212 that is arranged on the side surface 60 of the pump chamber 58 and a second spill passage 214 that is arranged on the side surface 62 of the pump chamber 58. The first spill passage 212 is designed to communicate a predetermined hydraulic pressure chamber 54a, from among the plurality of hydraulic pressure chambers 54, with the first high pressure discharge passage 206 when the entire predetermined hydraulic pressure chamber 54a is positioned between the opening of the first high pressure discharge passage 206 and the opening of the first low pressure discharge fluid passage 204, and thus not communicated with these discharge passages. Similarly, the second spill passage 214 is designed to communicate the predetermined hydraulic pressure chamber 54a with the second high pressure discharge passage 210 when the entire predetermined hydraulic pressure chamber 54a is positioned between the opening of the second high pressure discharge passage 210 and the opening of the second low pressure discharge passage 208, and thus not communicated with these discharge passages. The predetermined hydraulic pressure chamber 54a, from among the hydraulic pressure chambers 54, refers to an oil-tight momentary chamber that is sandwiched from the direction of the axis C1 by a wall surface 216 (see FIG. 8) between the opening of the first high pressure discharge passage 206 and the opening of the first low pressure discharge passage 204, and a wall surface 218 (see FIG. 9) between the opening of the second high pressure discharge passage 210 and the opening of the second low pressure discharge passage 208.

As shown in FIG. 8, the first spill passage 212 includes a first outer circumferential groove 220 and a first inner circumferential groove 222, in which, when the entire predetermined hydraulic pressure chamber 54a is positioned between the first low pressure discharge passage 204 and the first high pressure discharge passage 206, the first outer circumferential groove 220 extends in the circumferential direction rearward in the rotational direction from a radially outer side of a trajectory K of a mesh position X that is the closest proximal point or the contact point between the inner peripheral teeth 48 and the outer peripheral teeth 42 of a rear end surface 206a in the rotational direction of the first high pressure discharge passage 206, and a tip end portion of the first outer circumferential groove 220 is communicated with the predetermined hydraulic pressure chamber 54a, and the first inner circumferential groove 222 extends in the circumferential direction rearward in the rotational direction from a radially inner side of the trajectory K of the mesh position X of the inner peripheral teeth 48 and the outer peripheral teeth 42 of the rear end surface 206a, and a tip end portion of the first inner circumferential groove 222 is communicated with the predetermined hydraulic pressure chamber 54a.

As shown in FIG. 9, the second spill passage 214 is formed by a second outer circumferential groove 224 and a second inner circumferential groove 226, in which, when the entire predetermined hydraulic pressure chamber 54a is positioned between the second low pressure discharge passage 208 and the second high pressure discharge passage 210, the second outer circumferential groove 224 extends in the circumferential direction rearward in the rotational direction from a radially outer side of a trajectory K of a mesh position X that is the closest proximal point or the contact point between the inner peripheral teeth 48 and the outer peripheral teeth 42 of a rear end surface 210a in the rotational direction of the second high pressure discharge passage 210, and a tip end portion of the second outer circumferential groove 224 is communicated with the predetermined hydraulic pressure chamber 54a, and the second inner circumferential groove 226 extends in the circumferential direction rearward in the rotational direction from a radially inner side of the trajectory K of the mesh position X of the inner peripheral teeth 48 and the outer peripheral teeth 42 of the rear end surface 210a, and a tip end portion of the second inner circumferential groove 226 is communicated with the predetermined hydraulic pressure chamber 54a.

With the oil pump 200 structured as described above, when the drive gear 46 and the annular driven gear 52 rotate in the rotational direction, fluid stored in the oil pan 32 is drawn into the hydraulic pressure chamber 54 that moves through the circumferential range where the volume V increases. Also, fluid that has been drawn in and pressurized is delivered to the hydraulic control circuit 34 from the hydraulic pressure chamber 54 that moves through the circumferential range where the first low pressure discharge passage 204 and the second low pressure discharge passage 208 open, within the circumferential range where the volume V decreases. Also, fluid that has been drawn in and pressurized is delivered to the hydraulic control circuit 34 from the hydraulic pressure chamber 54 that moves through the circumferential range where the first high pressure discharge passage 206 and the second high pressure discharge passage 210 open, within the circumferential range where the volume V decreases.

Figure 10:
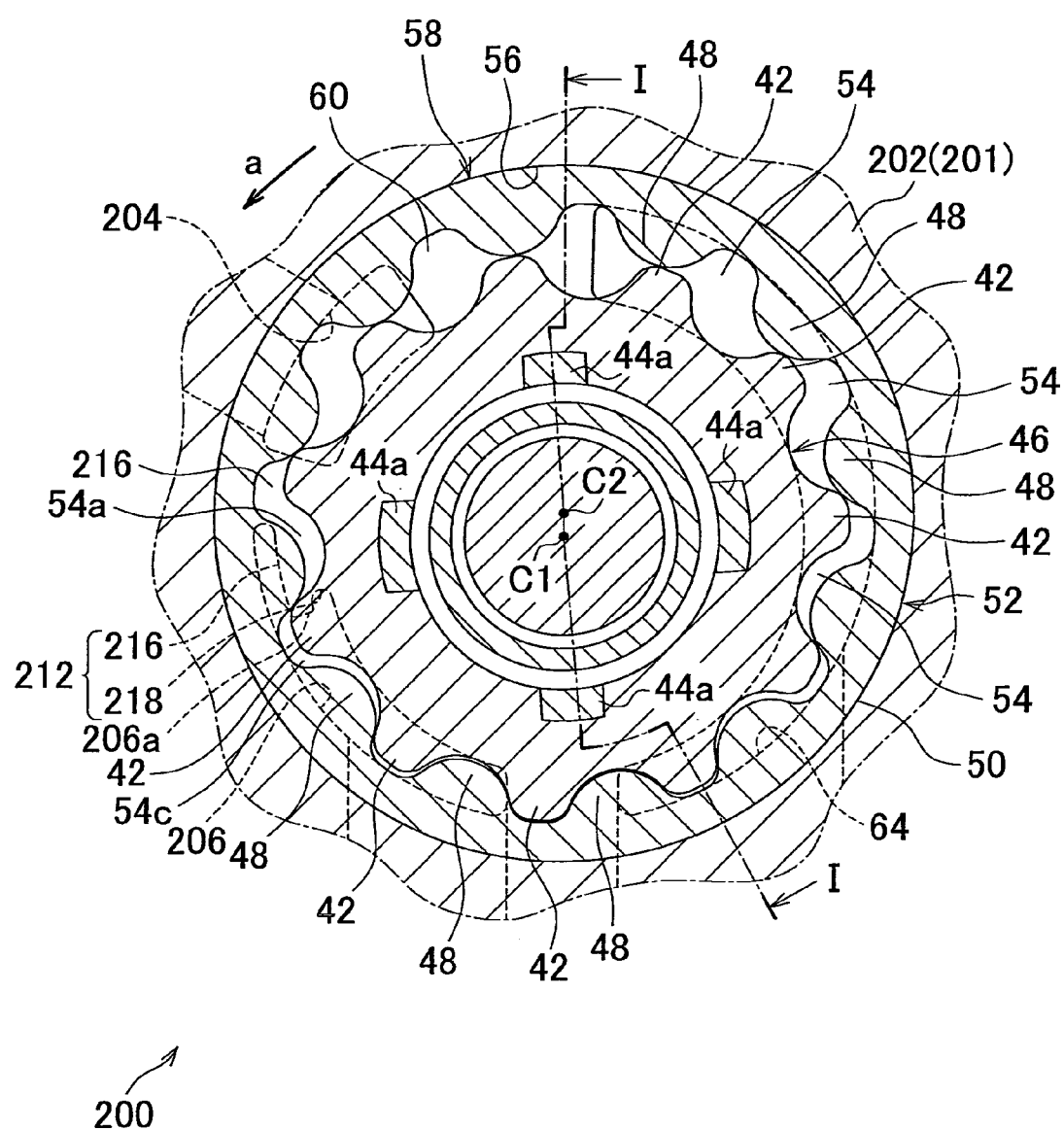
FIG. 10 is an oil pump sectional view that corresponds to FIG. 8, that shows a state in which the hydraulic pressure chamber is cut off from the high pressure discharge passages and the low pressure discharge passages.

Here, when the predetermined hydraulic pressure chamber 54a moves in the rotational direction and that predetermined hydraulic pressure chamber 54a passes between the first low pressure discharge passage 204 and the first high pressure discharge passage 206 (and between the second low pressure discharge passage 208 and the second high pressure discharge passage 210), the state changes from one in which the hydraulic pressure chamber 54 is directly communicated with the first low pressure discharge passage 204 and the second low pressure discharge passage 208, to one in which the hydraulic pressure chamber 54 is cut off from the high pressure discharge hydraulic passages and the low pressure discharge passages, as shown in FIG. 10, and one in which the hydraulic pressure chamber 54 is communicated with the first high pressure discharge passage 206 and the second high pressure discharge passage 210 via the first spill passage 212 and the second spill passage 214, respectively, as shown in FIGS. 8 and 9, and then to one in which the hydraulic pressure chamber 54 becomes communicated with the first high pressure discharge passage 206 and the second high pressure discharge passage 210.

As shown in FIGS. 8 and 9, when the predetermined hydraulic pressure chamber 54a is communicated with the first high pressure discharge passage 206 and the second high pressure discharge passage 210 via the first spill passage 212 and the second spill passage 214, respectively, the hydraulic pressure value inside the predetermined hydraulic pressure chamber 54a is maintained at the same value as the hydraulic pressure value inside the first high pressure discharge passage 206 and the second high pressure discharge passage 210. At this time, the hydraulic pressure value inside the predetermined hydraulic pressure chamber 54a is substantially the same as the hydraulic pressure value inside a predetermined hydraulic pressure chamber 54c that is adjacent to, in front of in the rotational direction, the predetermined hydraulic pressure chamber 54a, and that is communicated with the first high pressure discharge passage 206 and the second high pressure discharge passage 210. Therefore, fluid is inhibited from flowing from the predetermined hydraulic pressure chamber 54c into the predetermined hydraulic pressure chamber 54a through the closest proximal point or the contact point (i.e., the tip clearance) between the inner peripheral teeth 48 and the outer peripheral teeth 42 that are in mesh between the predetermined hydraulic pressure chamber 54a and the predetermined hydraulic pressure chamber 54c and that define those chambers.

As described above, according to the oil pump 200 of this second example embodiment, the first spill passage 212 is provided formed on the side surface 60 of the pump chamber 58 and the second spill passage 214 is provided formed on the side surface 62 of the pump chamber 58, to communicate the predetermined hydraulic pressure chamber 54a with the first high pressure discharge passage 206 and the second high pressure discharge passage 210, respectively, when the entire predetermined hydraulic pressure chamber 54a is positioned between the first low pressure discharge passage 204 and the first high pressure discharge passage 206. Therefore, when the hydraulic pressure inside the first low pressure discharge passage 204 and inside the second low pressure discharge passage 208 is reduced to the predetermined low hydraulic pressure value Pplow, and the predetermined hydraulic pressure chamber 54a passes between the first low pressure discharge passage 204 and the first high pressure discharge passage 206, the hydraulic pressure inside the predetermined hydraulic pressure chamber 54a escapes to the first high pressure discharge passage 206 and the second high pressure discharge passage 210 through the first spill passage 212 and the second spill passage 214, respectively, so the hydraulic pressure value inside the predetermined hydraulic, pressure chamber 54a is maintained at the same value as the hydraulic pressure value inside the first high pressure discharge passage 206 and inside the second high pressure discharge passage 210. Therefore, the difference between the hydraulic pressure value inside the predetermined hydraulic pressure chamber 54a and the hydraulic pressure value inside the predetermined hydraulic pressure chamber 54c that is adjacent to the predetermined hydraulic pressure chamber 54a and that is communicated with the first high pressure discharge passage 206 and the second high pressure discharge passage 210 will not increase, so fluid is inhibited from flowing into the predetermined hydraulic pressure chamber 54a from the first high pressure discharge passage 206 and the second high pressure discharge passage 210 through the closest proximal point or the contact point (i.e., the tip clearance) between the inner peripheral teeth 48 and the outer peripheral teeth 42. As a result, the volumetric efficiency on the high pressure discharge side can be inhibited from decreasing, while the hydraulic pressure inside the hydraulic pressure chamber 54 is prevented from suddenly increasing.

Also, according to the oil pump 200 of this example embodiment, the first high pressure discharge passage 206 and the second high pressure discharge passage 210 are provided in front of the first low pressure discharge passage 204 and the second low pressure discharge passage 208 in the rotational direction. Also, the first spill passage 212 is formed by the first outer circumferential groove 220 and the first inner circumferential groove 222, in which, when the entire predetermined hydraulic pressure chamber 54a is positioned between the first low pressure discharge passage 204 and the first high pressure discharge passage 206, the first outer circumferential groove 220 extends in the circumferential direction rearward in the rotational direction from a radially outer side of the trajectory K of the mesh position X of the inner peripheral teeth 48 and the outer peripheral teeth 42 of the rear end surface 206a in the rotational direction of the first high pressure discharge passage 206, and the tip end portion of the first outer circumferential groove 220 is communicated with the predetermined hydraulic pressure chamber 54a, and the first inner circumferential groove 222 extends in the circumferential direction rearward in the rotational direction from the radially inner side of the trajectory K of the mesh position X of the inner peripheral teeth 48 and the outer peripheral teeth 42 of the rear end surface 206a, and the tip end portion of the first inner circumferential groove 222 is communicated with the predetermined hydraulic pressure chamber 54a. The second spill passage 214 is formed by the second outer circumferential groove 224 and the second inner circumferential groove 226, in which, when the entire predetermined hydraulic pressure chamber 54a is positioned between the second low pressure discharge passage 208 and the second high pressure discharge passage 210, the second outer circumferential groove 224 extends in the circumferential direction rearward in the rotational direction from a radially outer side of the trajectory K of the mesh position X of the inner peripheral teeth 48 and the outer peripheral teeth 42 of the rear end surface 210a in the rotational direction of the second high pressure discharge passage 210, and the tip end portion of the second outer circumferential groove 224 is communicated with the predetermined hydraulic pressure chamber 54a, and the second inner circumferential groove 226 extends in the circumferential direction rearward in the rotational direction from the radially inner side of the trajectory K of the mesh position X of the inner peripheral teeth 48 and the outer peripheral teeth 42 of the rear end surface 210a, and the tip end portion of the second inner circumferential groove 226 is communicated with the predetermined hydraulic pressure chamber 54a. Accordingly, even while the predetermined hydraulic pressure chamber 54a and the predetermined hydraulic pressure chamber 54c that are adjacent in the circumferential direction sandwiching the mesh position X of the inner peripheral teeth 48 and the outer peripheral teeth 42 are maintained in a predetermined oil-tight state by the meshing of the inner peripheral teeth 48 and the outer peripheral teeth 42, the hydraulic pressure inside the predetermined hydraulic pressure chamber 54a is able to escape to the first high pressure discharge passage 206 and the second high pressure discharge passage 210 through the first spill passage 212 and the second spill passage 214, respectively, when the predetermined hydraulic pressure chamber 54a passes between the first low pressure discharge passage 204 and the first high pressure discharge passage 206.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

It is sufficient that at least one of the first high pressure discharge passage 68 (206) or the second high pressure discharge passage 72 (210) be provided.

Also, it is sufficient that at least one of the first low pressure discharge passage 70 (204) or the second low pressure discharge passage 74 (208) be provided.

It is sufficient that at least one of the first spill passage 76 (212) or the second spill passage 78 (214) be provided.

It is sufficient that the first spill passage 76 (212) include at least one of the first outer circumferential groove 81 (220) or the first inner circumferential groove 82 (222).

It is sufficient that the second spill passage 78 (214) include at least one of the second outer circumferential groove 84 (224) or the second inner circumferential groove 86 (226).

Also, the oil pump 36 (200) is provided in the automatic transmission 16 and supplies hydraulic pressure to the hydraulic control circuit 34 of the automatic transmission 16, but the invention is not limited to this. That is, the oil pump 36 (200) may be another device provided in the vehicle, and may be provided in another kind of transmission such as a continuously variable transmission, for example.

The invention claimed is:

1. A vehicular internal gear type oil pump including:
   a drive gear that has outer peripheral teeth and that is provided rotatable about an axis;
   an annular driven gear that has inner peripheral teeth that mesh with the outer peripheral teeth of the drive gear and that is provided rotatable about an offset axis that is offset from the axis, and that is rotatably driven by the drive gear;

a pump chamber inside of which the driven gear and the drive gear are housed;

a housing that has a high pressure discharge passage and a low pressure discharge passage that are open, a predetermined distance apart from each other in a circumferential direction, to a side surface of the pump chamber, in order to discharge fluid from within the pump chamber, and wherein a plurality of hydraulic pressure chambers, that are formed in the circumferential direction by a mesh gap between the inner peripheral teeth and the outer peripheral teeth, move in a predetermined rotational direction as the drive gear and the driven gear rotate;

wherein the hydraulic pressure chambers are communicated with the high pressure discharge passage and the low pressure discharge passage in a process in which the volume of the hydraulic pressure chambers is reduced; and a spill passage formed in a side surface of the pump chamber to communicate a predetermined hydraulic pressure chamber, from among the plurality of hydraulic pressure chambers, with the high pressure discharge passage when the entire predetermined hydraulic pressure chamber is positioned between the high pressure discharge passage and the low pressure discharge passage, wherein the high pressure discharge passage is provided behind, in the rotational direction, the low pressure discharge passage, and wherein the spill passage includes at least one of an outer circumferential groove or an inner circumferential groove, in which, when the entire predetermined hydraulic pressure chamber is positioned between the high pressure discharge passage and the low pressure discharge passage, the outer circumferential groove extends in the circumferential direction forward in the rotational direction from a radially outer side of a mesh position of the inner peripheral teeth and the outer peripheral teeth of a front end surface in the rotational direction of the high pressure discharge passage, and a tip end portion of the outer circumferential groove is communicated with the predetermined hydraulic pressure chamber, and the inner circumferential groove extends in the circumferential direction forward in the rotational direction from a radially inner side of the mesh position of the inner peripheral teeth and the outer peripheral teeth of the front end surface in the rotational direction of the high pressure discharge passage, and a tip end portion of the inner circumferential groove is communicated with the predetermined hydraulic pressure chamber.

2. A vehicular internal gear type oil pump including:

a drive gear that has outer peripheral teeth and that is provided rotatable about an axis;

an annular driven gear that has inner peripheral teeth that mesh with the outer peripheral teeth of the drive gear and that is provided rotatable about an offset axis that is offset from the axis, and that is rotatably driven by the drive gear;

a pump chamber inside of which the driven gear and the drive gear are housed;

a housing that has a high pressure discharge passage and a low pressure discharge passage that are open, a predetermined distance apart from each other in a circumferential direction. to a side surface of the pump chamber, in order to discharge fluid from within the pump chamber, wherein a plurality of hydraulic pressure chambers, that are formed in the circumferential direction by a mesh gap between the inner peripheral teeth and the outer peripheral teeth, move in a predetermined rotational direction as the drive gear and the driven gear rotate, wherein the hydraulic pressure chambers are communicated with the high pressure discharge passage and the low pressure discharge passage in a process in which the volume of the hydraulic pressure chambers is reduced; and a spill passage formed in a side surface of the pump chamber communicate a predetermined hydraulic pressure chamber, from among the plurality of hydraulic pressure chambers, with the high pressure discharge passage when the entire predetermined hydraulic pressure chamber is positioned between the high pressure discharge passage and the low pressure discharge passage, wherein the high pressure discharge passage is provided in front of, in the rotational direction, the low pressure discharge passage, and wherein the spill passage includes at least one of an outer circumferential groove or an inner circumferential groove, in which, when the entire predetermined hydraulic pressure chamber is positioned between the low pressure discharge passage and the high pressure discharge passage, the outer circumferential groove extends in the circumferential direction rearward in the rotational direction from a radially outer side of a mesh position of the inner peripheral teeth and the outer peripheral teeth of a rear end surface in the rotational direction of the high pressure discharge passage, and a tip end portion of the outer circumferential groove is communicated with the predetermined hydraulic pressure chamber, and the inner circumferential groove extends in the circumferential direction rearward in the rotational direction from a radially inner side of the mesh position of the inner peripheral teeth and the outer peripheral teeth of the rear end surface in the radial direction of the high pressure discharge passage, and a tip end portion of the inner circumferential groove is communicated with the predetermined hydraulic pressure chamber.

3. The vehicular internal gear type oil pump according to claim 1, wherein:

the high pressure discharge passage includes a first high pressure discharge passage formed in a pump body;

the low pressure discharge passage includes a first low pressure discharge passage formed in the pump body;

the high pressure discharge passage includes a second high pressure discharge passage formed in a pump cover; and the low pressure discharge passage includes a second low pressure discharge passage formed in the pump cover.

4. The vehicular internal gear type oil pump according to claim 3, wherein the housing comprises the pump body and the pump cover.

* * * * *